(12) United States Patent
Mendell

(10) Patent No.: US 11,902,630 B2
(45) Date of Patent: Feb. 13, 2024

(54) SYSTEMS AND METHODS FOR VALIDATING LIVE PROGRAMMING CONTENT BASED ON THIRD-PARTY DATA

(71) Applicant: DK Crown Holdings Inc., Boston, MA (US)

(72) Inventor: Jordan Mendell, Boca Raton, FL (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 17/976,097

(22) Filed: Oct. 28, 2022

(65) Prior Publication Data

US 2023/0136292 A1 May 4, 2023

Related U.S. Application Data

(60) Provisional application No. 63/273,580, filed on Oct. 29, 2021.

(51) Int. Cl.
*H04N 21/262* (2011.01)
*H04N 21/488* (2011.01)
(Continued)

(52) U.S. Cl.
CPC ..... *H04N 21/4882* (2013.01); *G07F 17/3211* (2013.01); *G07F 17/3237* (2013.01); *G07F 17/3288* (2013.01); *H04N 21/2187* (2013.01); *H04N 21/2353* (2013.01); *H04N 21/25808* (2013.01); *H04N 21/2625* (2013.01); *H04N 21/26208* (2013.01); *H04N 21/41407* (2013.01); *H04N 21/4316* (2013.01);
(Continued)

(58) Field of Classification Search
CPC .............. H04N 21/26208; H04N 21/2625
See application file for complete search history.

(56) References Cited

U.S. PATENT DOCUMENTS 5,830,068 A   11/1998   Brenner et al.
6,735,487 B1   5/2004   Marshall et al.
(Continued)

FOREIGN PATENT DOCUMENTS

EP   1 484 723 A2   12/2004
EP   4 024 322 A1   7/2022

OTHER PUBLICATIONS

Non-Final Office Action on U.S. Appl. No. 17/516,150 dated Nov. 18, 2022.
(Continued)

*Primary Examiner* — Jefferey F Harold
*Assistant Examiner* — Alexander Boyd
(74) *Attorney, Agent, or Firm* — Foley & Lardner LLP

(57) ABSTRACT

Systems and methods for validating live programming content based on data are provided. A system can access an initial schedule for a live broadcast event provided by a broadcast provider computing system, and identify an initial start time for the live broadcast event and a duration for the live broadcast event. The system can receive an update relating to the live broadcast event from a data source. The system can determine that the initial schedule is invalid based on the update, and set a flag for the live broadcast event indicating that the initial schedule has changed. The system can then modify a selection policy for content to display with the live broadcast event responsive to the flag.

20 Claims, 10 Drawing Sheets

(51) Int. Cl.
- *H04N 21/2187* (2011.01)
- *H04N 21/478* (2011.01)
- *H04N 21/45* (2011.01)
- *G07F 17/32* (2006.01)
- *H04N 21/431* (2011.01)
- *H04N 21/6547* (2011.01)
- *H04N 21/81* (2011.01)
- *H04N 21/458* (2011.01)
- *H04N 21/475* (2011.01)
- *H04N 21/258* (2011.01)
- *H04N 21/6543* (2011.01)
- *H04N 21/235* (2011.01)
- *H04N 21/414* (2011.01)

(52) U.S. Cl.
CPC ....... *H04N 21/458* (2013.01); *H04N 21/4518* (2020.08); *H04N 21/4524* (2013.01); *H04N 21/4532* (2013.01); *H04N 21/478* (2013.01); *H04N 21/4753* (2013.01); *H04N 21/6543* (2013.01); *H04N 21/6547* (2013.01); *H04N 21/8126* (2013.01); *H04N 21/8133* (2013.01)

(56) References Cited

U.S. PATENT DOCUMENTS

| | | |
|---|---|---|
| 7,904,924 B1 | 3/2011 | Heer et al. |
| 8,538,563 B1 | 9/2013 | Barber |
| 10,664,138 B2 | 5/2020 | Carney et al. |
| 11,190,736 B2 | 11/2021 | Kawakami et al. |
| 11,217,067 B1 | 1/2022 | Huke et al. |
| 2005/0005291 A1 | 1/2005 | McGinley |
| 2008/0066111 A1 | 3/2008 | Ellis et al. |
| 2008/0112690 A1 | 5/2008 | Shahraray et al. |
| 2008/0148317 A1 | 6/2008 | Opaluch |
| 2009/0082095 A1 | 3/2009 | Walker et al. |
| 2009/0158374 A1 | 6/2009 | Malaure et al. |
| 2009/0183178 A1 | 7/2009 | Imai et al. |
| 2009/0288118 A1 | 11/2009 | Chang |
| 2010/0041482 A1 | 2/2010 | Kumar et al. |
| 2010/0262986 A1 | 10/2010 | Adimatyam et al. |
| 2011/0069940 A1 | 3/2011 | Shimy et al. |
| 2011/0086699 A1 | 4/2011 | Allen et al. |
| 2011/0154390 A1* | 6/2011 | Smith ................ H04N 21/482 725/38 |
| 2012/0033943 A1 | 2/2012 | Klappert et al. |
| 2013/0002716 A1 | 1/2013 | Walker et al. |
| 2013/0027613 A1 | 1/2013 | Kim et al. |
| 2013/0225298 A1 | 8/2013 | Hamlin et al. |
| 2013/0282421 A1 | 10/2013 | Graff et al. |
| 2014/0062696 A1 | 3/2014 | Packard et al. |
| 2014/0068692 A1 | 3/2014 | Archibong et al. |
| 2014/0129570 A1 | 5/2014 | Johnson |
| 2014/0130079 A1 | 5/2014 | Arora et al. |
| 2014/0201769 A1 | 7/2014 | Neumeier et al. |
| 2014/0282721 A1 | 9/2014 | Kuncl et al. |
| 2015/0163547 A1* | 6/2015 | Whitten ........... H04N 21/26283 725/58 |
| 2015/0172338 A1 | 6/2015 | Moran et al. |
| 2016/0088352 A1 | 3/2016 | Agarwal et al. |
| 2016/0227281 A1 | 8/2016 | Abuelsaad et al. |
| 2017/0034594 A1* | 2/2017 | Francis ........... H04N 21/26241 |
| 2017/0070769 A1 | 3/2017 | Bostick et al. |
| 2018/0048936 A1 | 2/2018 | Gupta et al. |
| 2018/0060439 A1 | 3/2018 | Kula et al. |
| 2018/0108380 A1 | 4/2018 | Packard et al. |
| 2019/0205839 A1 | 7/2019 | Dotan-Cohen et al. |
| 2019/0268663 A1 | 8/2019 | Fischer |
| 2019/0349638 A1* | 11/2019 | Baek ................... H04N 21/237 |
| 2019/0362601 A1 | 11/2019 | Kline et al. |
| 2019/0384469 A1 | 12/2019 | Lo et al. |
| 2020/0213678 A1 | 7/2020 | Pleiman |
| 2020/0245017 A1 | 7/2020 | Ganschow et al. |
| 2020/0252664 A1 | 8/2020 | Weinraub |
| 2020/0357246 A1 | 11/2020 | Nelson et al. |
| 2021/0076099 A1 | 3/2021 | Ganschow et al. |
| 2021/0217269 A1 | 7/2021 | Huke et al. |
| 2022/0103905 A1* | 3/2022 | Montgomery ..... H04N 21/2543 |
| 2022/0157127 A1 | 5/2022 | Tadepalli et al. |
| 2022/0309873 A1 | 9/2022 | Russ et al. |
| 2022/0321951 A1 | 10/2022 | Chandrashekar et al. |
| 2022/0377427 A1 | 11/2022 | Montgomery et al. |

OTHER PUBLICATIONS

Non-Final Office Action on U.S. Appl. No. 17/976,120 dated Jan. 25, 2023.
Non-Final Office Action on U.S. Appl. No. 17/976,130 dated Feb. 2, 2023.
Final Office Action on U.S. Appl. No. 17/976,130 dated Jun. 1, 2023.
Final Office Action on U.S. Appl. No. 17/516,150 dated Mar. 10, 2023.
Non-Final Office Action on U.S. Appl. No. 17/976,107 dated Mar. 28, 2023.
Non-Final Office Action on U.S. Appl. No. 17/976,141 dated Mar. 16, 2023.
Notice of Allowance on U.S. Appl. No. 17/976,120 dated May 9, 2023.
Final Office Action on U.S. Appl. No. 17/976,107 dated Aug. 11, 2023.
Final Office Action on U.S. Appl. No. 17/976,141 dated Jul. 13, 2023.
Non-Final Office Action on U.S. Appl. No. 17/976,130 dated Sep. 14, 2023.
Notice of Allowance on U.S. Appl. No. 17/516,150 dated Sep. 21, 2023.
Non-Final Office Action on U.S. Appl. No. 17/947,444 dated Oct. 11, 2023.
Notice of Allowance on U.S. Appl. No. 17/943,930 dated Oct. 17, 2023.
Final Office Action on U.S. Appl. No. 17/516,150 dated May 27, 2022.
Non-Final Office Action on U.S. Appl. No. 17/516,150 dated Jan. 28, 2022.
Non-Final Office Action on U.S. Appl. No. 17/516,134 dated Feb. 1, 2022.
Non-Final Office Action on U.S. Appl. No. 17/516,197 dated Jan. 13, 2022.
Non-Final Office Action on U.S. Appl. No. 17/516,200 dated Dec. 21, 2021.
Notice of Allowance on U.S. Appl. No. 17/516,134 dated Jun. 6, 2022.
Notice of Allowance on U.S. Appl. No. 17/516,197 dated May 6, 2022.
Notice of Allowance on U.S. Appl. No. 17/516,200 dated Apr. 27, 2022.
Non-Final Office Action on U.S. Appl. No. 17/976,141 dated Nov. 29, 2023.

* cited by examiner

SYSTEMS AND METHODS FOR VALIDATING LIVE PROGRAMMING CONTENT BASED ON THIRD-PARTY DATA

CROSS-REFERENCE TO RELATED APPLICATIONS

The present application claims the benefit of and priority to U.S. Provisional Patent Application No. 63/273,580, filed Oct. 29, 2021, and titled "SYSTEMS AND METHODS FOR IMPROVED MANAGEMENT OF PROCESSING BROADCAST DATA," the contents of which is incorporated herein by reference in its entirety for all purposes.

BACKGROUND

The present disclosure relates generally to broadcast environments. In certain instances, broadcasted events (e.g., live sports games, etc.) may be subject to unforeseen delays (e.g., rain delays). Conventional broadcast systems are unable to compensate for unexpected delays in real-time.

SUMMARY

It is therefore advantageous for a system to communicate with data sources and provide real-time notifications, alerts, and interactive content related to real-time delays for display with broadcast content at broadcast receiver devices such as cable boxes, set top boxes, or smart-televisions. In addition, the systems and methods described herein can provide notifications or interactive user interface elements for display with (e.g., live event information, content relating to other broadcast content, wager opportunities, etc.) to displays of players watching broadcast events. Such real-time notifications can provide context for players that are unaware of the unforeseen delays in live events. There exists a need to monitor and verify times associated with broadcasted events using data systems, and a need to display these verified times in connection with broadcast content. The systems and methods described herein therefore improve upon conventional broadcast systems by extending their capabilities to provide such functionality.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method. The method can be performed, for example, by one or more processor coupled to memory. The method includes accessing an initial schedule for a live broadcast event provided by a broadcast provider computing system. The method further includes identifying from the initial schedule, an initial start time for the live broadcast event and a duration for the live broadcast event. The method further includes receiving an update relating to the live broadcast event from a data source. The method further includes determining that the initial schedule is invalid based on the update. The method further includes setting a flag for the live broadcast event indicating that the initial schedule has changed. The method further includes modifying a selection policy for content to display with the live broadcast event responsive to the flag.

In some implementations, accessing the initial schedule for the live broadcast event further includes transmitting a request to the broadcast provider computing system to access the initial schedule for the live broadcast event and receiving the initial schedule from the broadcast provider computing system responsive to the request.

In some implementations, identifying the initial start time for the live broadcast event further includes extracting the initial start time from the initial schedule.

In some implementations, identifying the duration for the live broadcast event further includes calculating the duration for the live broadcast event based on a difference between an initial end time for the live broadcast event and the initial start time for the live broadcast event.

In some implementations, receiving the update relating to the live broadcast event is responsive to transmitting to the data source, a request for the update relating to the live broadcast event.

In some implementations, determining that the initial schedule is invalid based on the update further includes determining that the update indicates an actual start time for the live broadcast event is different from the initial start time for the live broadcast event.

In some implementations, determining that the initial schedule is invalid based on the update further includes determining that the update indicates an actual duration for the live broadcast event is different from the duration for the live broadcast event identified from the initial schedule.

In some implementations, setting the flag for the live broadcast event further includes transmitting a request to the broadcast provider computing system to modify the initial start time of the live broadcast event according to the update.

In some implementations, modifying the selection policy for content to display with the live broadcast event further comprises restricting selection of content for display with the live broadcast event until an actual start time of the live broadcast event.

In some implementations, modifying the selection policy for content to display with the live broadcast event further includes identifying a plurality of profiles each having one or more attributes associated with the live broadcast event, identifying via the broadcast provider computing system, a subset of the plurality of user profiles corresponding to a respective set of broadcast receiver devices that are displaying content, and selecting, by the one or more processors, content corresponding to the live broadcast event to display at the respective set of broadcast receiver devices based on the flag.

Another implementation of the present disclosure is a system. The system includes one or more processors coupled to memory, the one or more processors configured to access an initial schedule for a live broadcast event provided by a broadcast B provider computing system. The one or more processors are further configured to identify, from the initial schedule, an initial start time for the live broadcast event and a duration for the live broadcast event. The one or more processors are further configured to receive an update relating to the live broadcast event from a data source. The one or more processors are further configured to determine that the initial schedule is invalid based on the update. The one or more processors are further configured to set a flag for the live broadcast event indicating that the initial schedule has changed. The one or more processors are further configured to modify a selection policy for content to display with the live broadcast event responsive to the flag.

In some implementations, to access the initial schedule for the live broadcast event, the one or more processors are further configured to transmit a request to the broadcast provider computing system to access the initial schedule for the live broadcast event and receive the initial schedule from the broadcast provider computing system responsive to the request.

In some implementations, to identify the initial start time for the live broadcast event, the one or more processors are further configured to extract the initial start time from the initial schedule.

In some implementations, to identify the duration for the live broadcast event, the one or more processors are further configured to calculate the duration for the live broadcast event based on a difference between an initial end time for the live broadcast event and the initial start time for the live broadcast event.

In some implementations, the one or more processors are further configured to receive the update relating to the live broadcast event responsive to transmitting a request for the update relating to the live broadcast event to the data source.

In some implementations, to determine that the initial schedule is invalid based on the update, the one or more processors are further configured to determine that the update indicates an actual start time for the live broadcast event is different from the initial start time for the live broadcast event.

In some implementations, to determine that the initial schedule is invalid based on the update, the one or more processors are further configured to determine that the update indicates an actual duration for the live broadcast event is different from the duration for the live broadcast event identified from the initial schedule.

In some implementations, to set the flag for the live broadcast event, the one or more processors are further configured to transmit a request to the broadcast provider computing system to modify the initial start time of the live broadcast event according to the update.

In some implementations, to modify the selection policy for content to display with the live broadcast event, the one or more processors are further configured to restrict selection of content for display with the live broadcast event until an actual start time of the live broadcast event.

In some implementations, to modify the selection policy for content to display with the live broadcast event, the one or more processors are further configured to identify a plurality of user profiles each having one or more attributes associated with the live broadcast event, identify, via the broadcast provider computing system, a subset of the plurality of user profiles corresponding to a respective set of broadcast receiver devices that are displaying content, and select content corresponding to the live broadcast event to display at the respective set of broadcast receiver devices based on the flag.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1A:
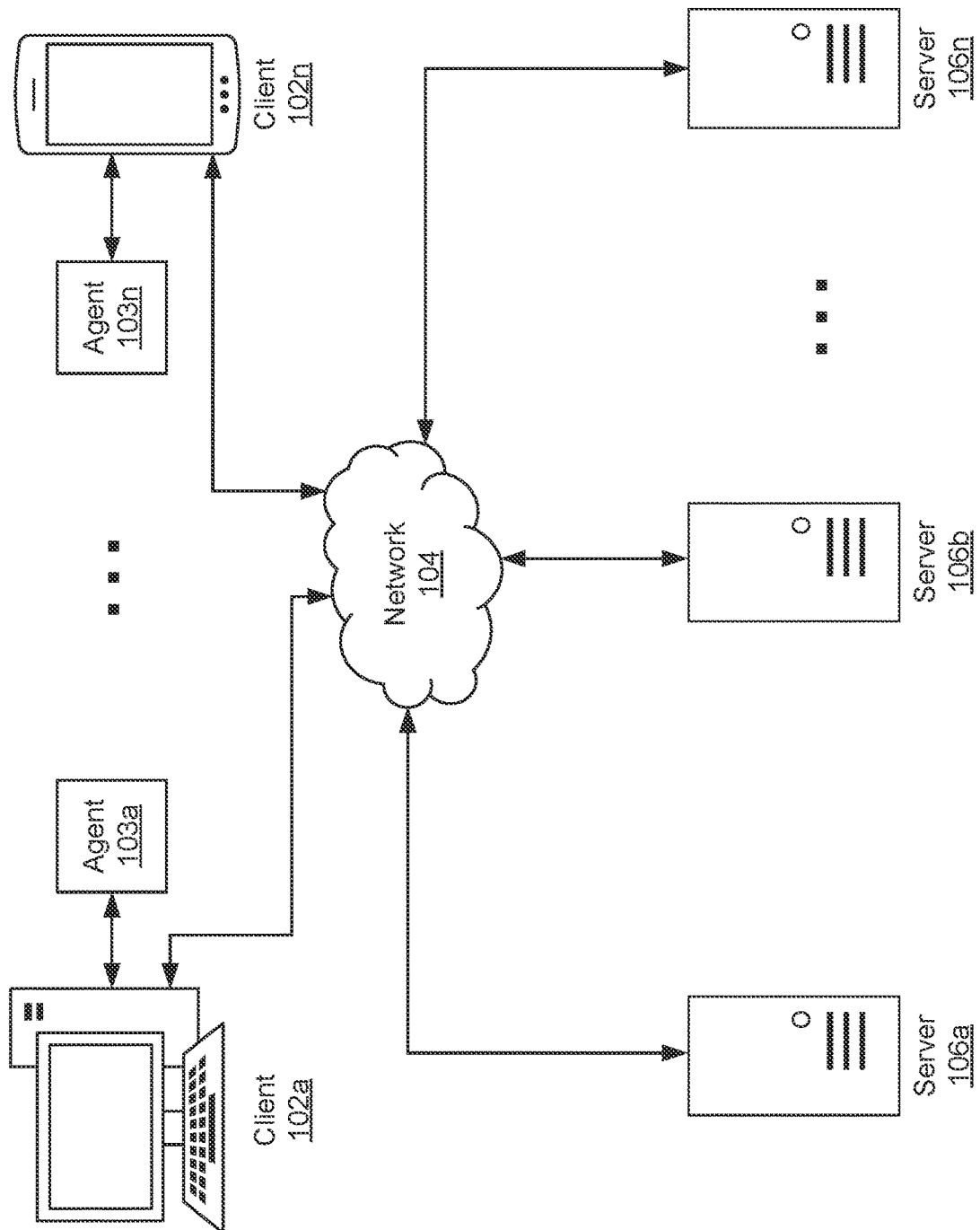
FIG. 1A is a block diagram of a client-server network, according to some embodiments.

Referring generally to the FIGURES, systems and methods for validating times of broadcasting events are shown, according to some embodiments. Broadcasted events (e.g., live baseball games, poker matches, etc.) can be set for an initially scheduled start time, which may be subject to change due to unforeseen events (e.g., rain delays, etc.). As such, a system configured to provide notifications, alerts, or interactive content items to broadcast receiver devices that are displaying live broadcast content, may be configured to monitor and/or verify any changes to the initial start time of the broadcasted events, such that the scheduling of displaying the notifications, alerts, or interactive content can be updated appropriately. This may be performed in part by querying databases and analyzing the queried information to determine any changes to initial start times of broadcasted events.

As described herein, the term "broadcast event" can refer to any event that is broadcasted via a broadcast provider system (e.g., DIRECT TV, XFINITY, etc.). These broadcast events can be either live, pre-recorded, and/or re-runs. For example, broadcast events can include sport games, poker matches, Olympic games, live reality shows, and live game shows. While the systems and methods disclosed herein generally refer to baseball games, these are merely examples of the present techniques, and should not be considered limiting.

In addition, the term "broadcast" need not necessarily be limited to content provided via proprietary television networks (e.g., cable, fiber-optic, satellite, etc.). Indeed, the term "broadcast," as used herein, may be used to describe both television content and live-streaming content provided via computer networks from one or more servers. Such live streams may be provided to various client devices or broadcast receiver devices via one or more computer networks. The live streams may depict live events such as sport games, poker matches, Olympic Games, live reality shows, and live game shows, among others.

As described herein, the term "selection policy" may refer to a method or system for providing notifications, alerts, messages, or interactive content (e.g., which may include wager opportunities, etc.) to players viewing the broadcast events. A selection policy may be a process performed by the processing circuitry of a schedule validation system as described herein. For example, if a player is watching a broadcast event on their television and a window appears 10 minutes before the scheduled baseball game that they are watching, and the window asks if they would like bet on which team wins, the customer may be able to select an option (e.g., via user input as described herein), which can be relayed back to the system (e.g., scheduled validation system 205, etc.) for further processing. The notifications or interactive content may include a variety of user-selectable user interface elements, which may enable a player to provide wager options and preferences, and is not limited to selecting a winning team. For example, the notifications or interactive content described herein may include actionable objects (e.g., buttons, hyperlinks, interactive user interface elements, etc.) that enable the player may to select wager amounts, certain players on which to wager, wager conditions such as player(s) performing certain tasks (e.g., player 1 hits a homerun this game, etc.), an expected score, and other properties.

As described herein one or more "client devices" may refer to any type of display device configured to display the broadcast event provided by the broadcast providers and/or the notification windows provided by schedule validation system (described in detail below). While the systems and methods disclosed herein generally refer to broadcast receiver devices (e.g., DVRs, cable boxes, set top boxes, computer-enabled televisions, etc.) as being the client devices (e.g., the client devices 220 described in connection with FIG. 2), this is merely meant to be exemplary and should not be considered limiting. For example, client devices may include computer enabled televisions (sometimes referred to herein as "smart televisions"), computers with monitors, smartphones, tablets, and laptops. As used herein, the term "broadcast receiver device," may be used interchangeably with the term "client device."

While the systems and methods disclosed herein refer to start times as the times of the broadcast events that are analyzed, monitored, and adjusted, this is merely meant to be exemplary and should not be considered limiting. Any times associated with the broadcast events can be changed, and any times associated with the broadcast events can be monitored and/or verified. Furthermore, the selection policies that may be provided during a broadcast event can be provided at any point prior to, during, and/or after a broadcast event.

Computing Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
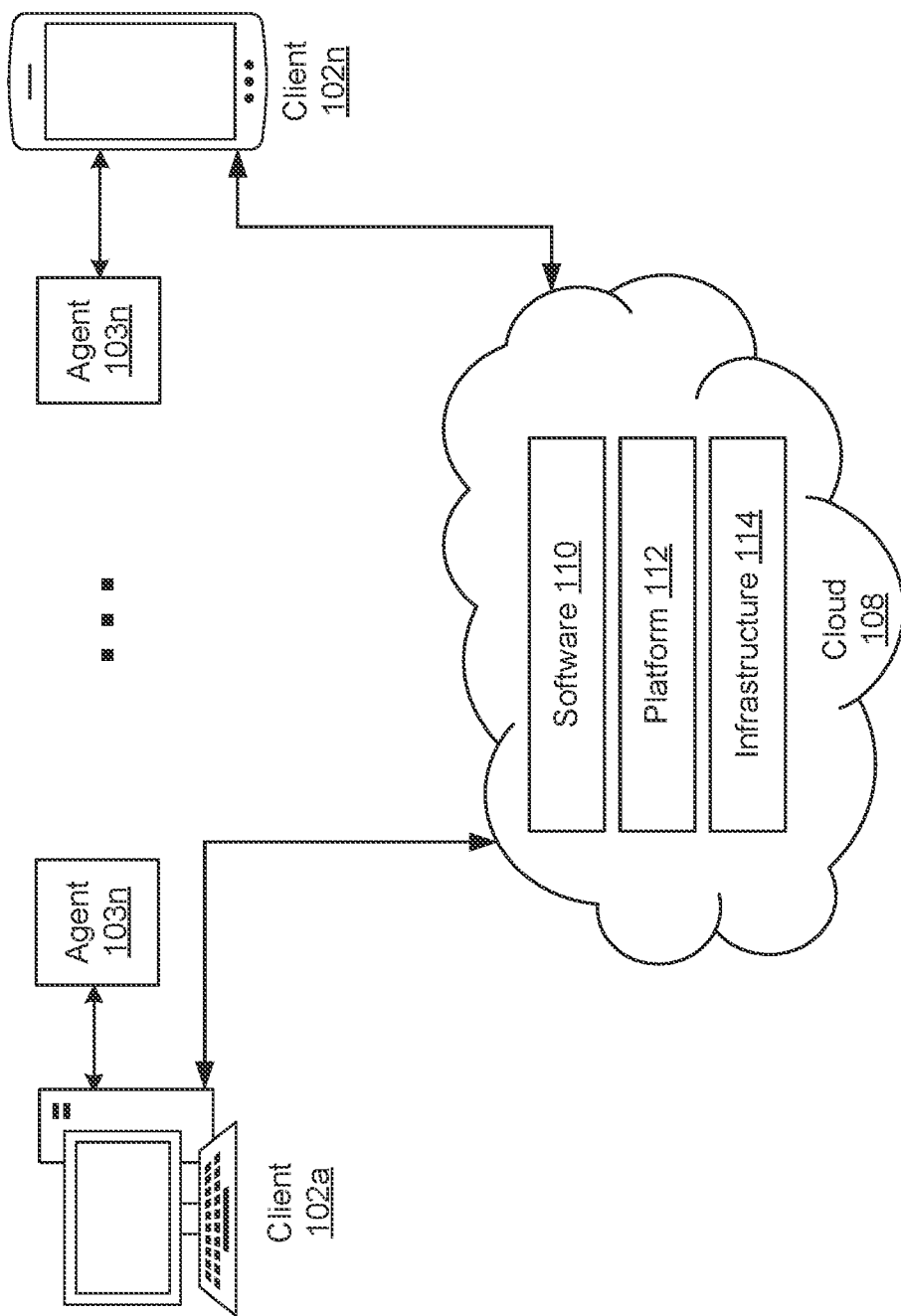
FIG. 1B is a block diagram of a cloud network, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
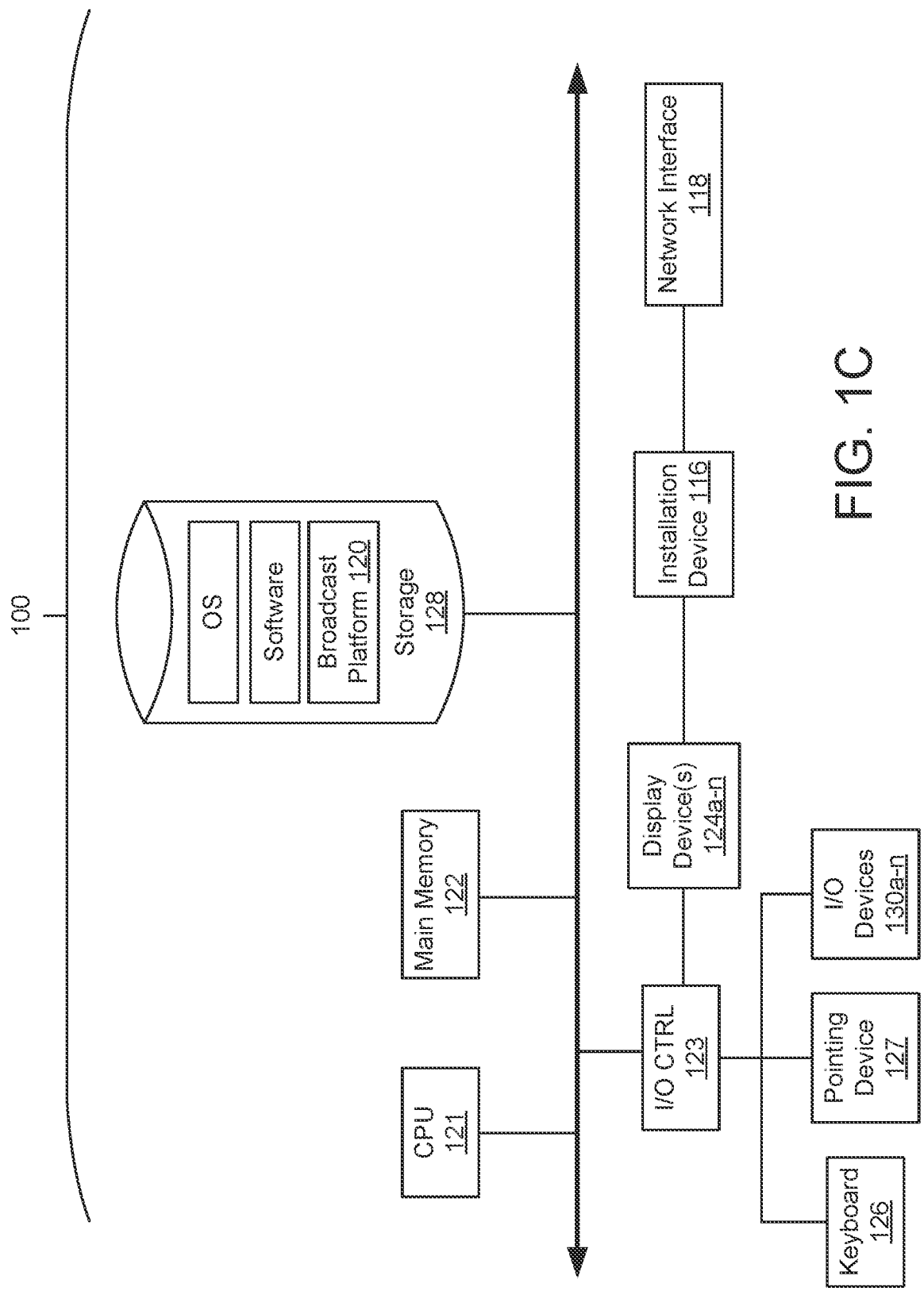
FIG. 1C is a block diagram depicting embodiments of computing devices useful in connection with the methods and systems described herein, which can be implemented in the networks of FIGS. 1A-B, according to some embodiments.
Figure 1D:
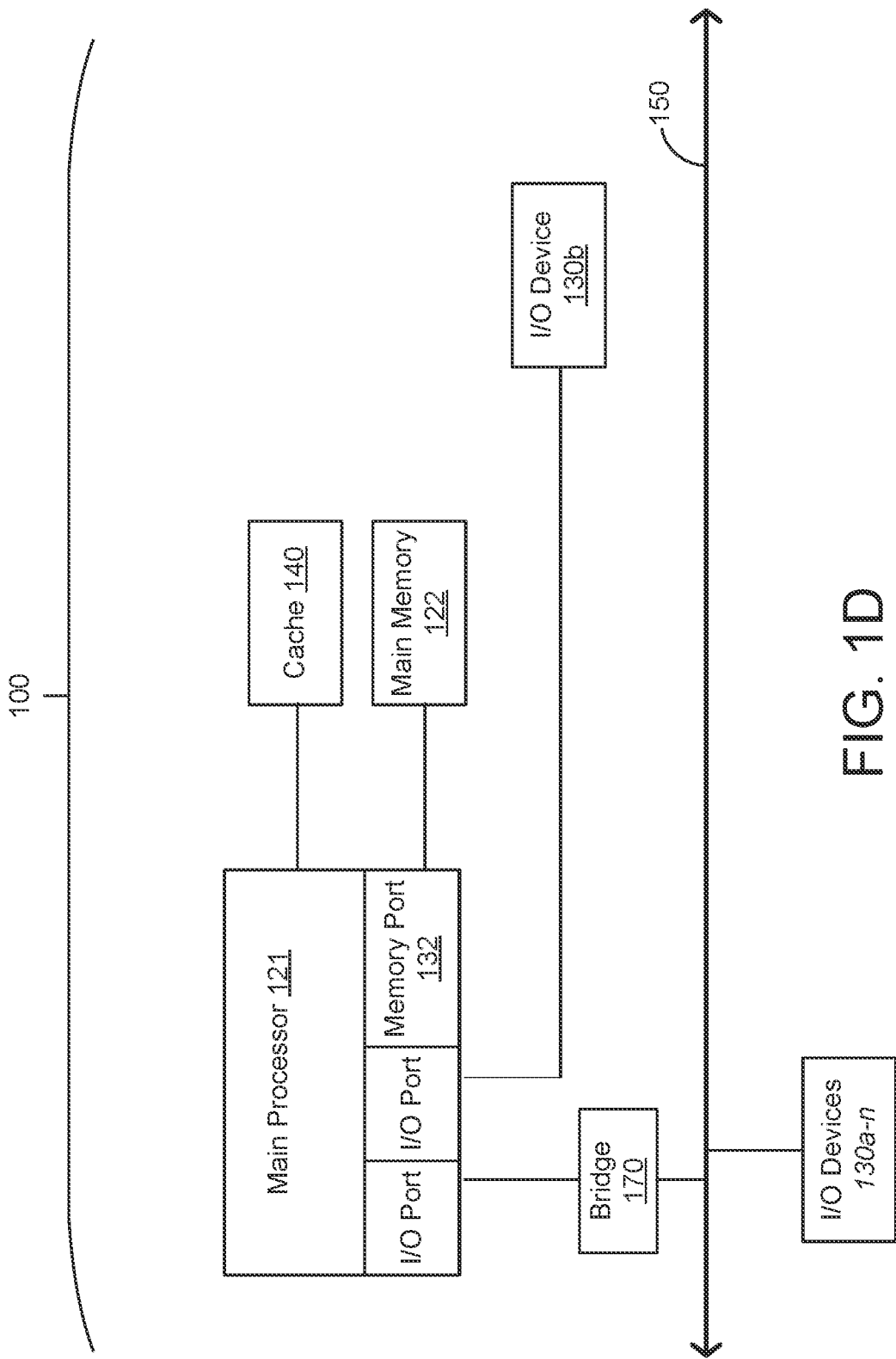
FIG. 1D is a block diagram depicting embodiments of computing devices useful in connection with the methods and systems described herein, which can be implemented in the networks of FIGS. 1A-B, according to some embodiments.

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and broadcast platform 120, which can implement any of the features of the schedule validation system 205 described herein below in connection with FIGS. 2A and 2B. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (B SRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the broadcast platform 120. Broadcast platform 120 may be configured to be or include any type of data and/or processing for performing broadcasting events and/or storing data based on the broadcasting events, and can include software or combinations of hardware and software that implement the functionalities of the schedule validation system 205 described in connection with FIGS. 2A and 2B. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 may also install software or application from an application distribution platform. In some embodiments, client device 100 can be a cable box, a set top box, or any other type of processing device communicably couple with and/or proximate to broadcast receiver devices Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Schedule Validation Systems

Conventionally, broadcast receiver systems or devices, such as cable boxes, set top boxes, and satellite receiver boxes, operate using fixed hardware and software that does not enable communications with external or unauthorized sources. For example, although cable boxes may communicate with broadcast provider systems, such as cable providers or other broadcast providers, such receiver boxes are generally unable to display additional content or monitor the broadcast content displayed by broadcast provider systems. Further, even if such broadcast receiver devices include applications that can communicate with one or more servers, these devices do not include the capabilities to display content or application information at the same time (e.g., in a seamless manner) as broadcast content provided by broadcast systems. The systems and methods of this technical solution these and other issues by extending the functionality of applications and environments on broadcast receiver devices, to provide applications that display additional content, which may include notifications, alerts, or other interactive interfaces, with broadcast content. To do so, a server or other external computing device can generate display instructions for applications executing on such broadcast receiver devices to display additional user interfaces with broadcast content, and transmit those instructions via a computer network or via a proprietary broadcast network maintained by a broadcast provider. In doing so, the additional content, which may include interactive user interfaces, can be displayed such that it that seamlessly integrates the application interfaces with broadcast content provided by a broadcast provider system.

Figure 2A:
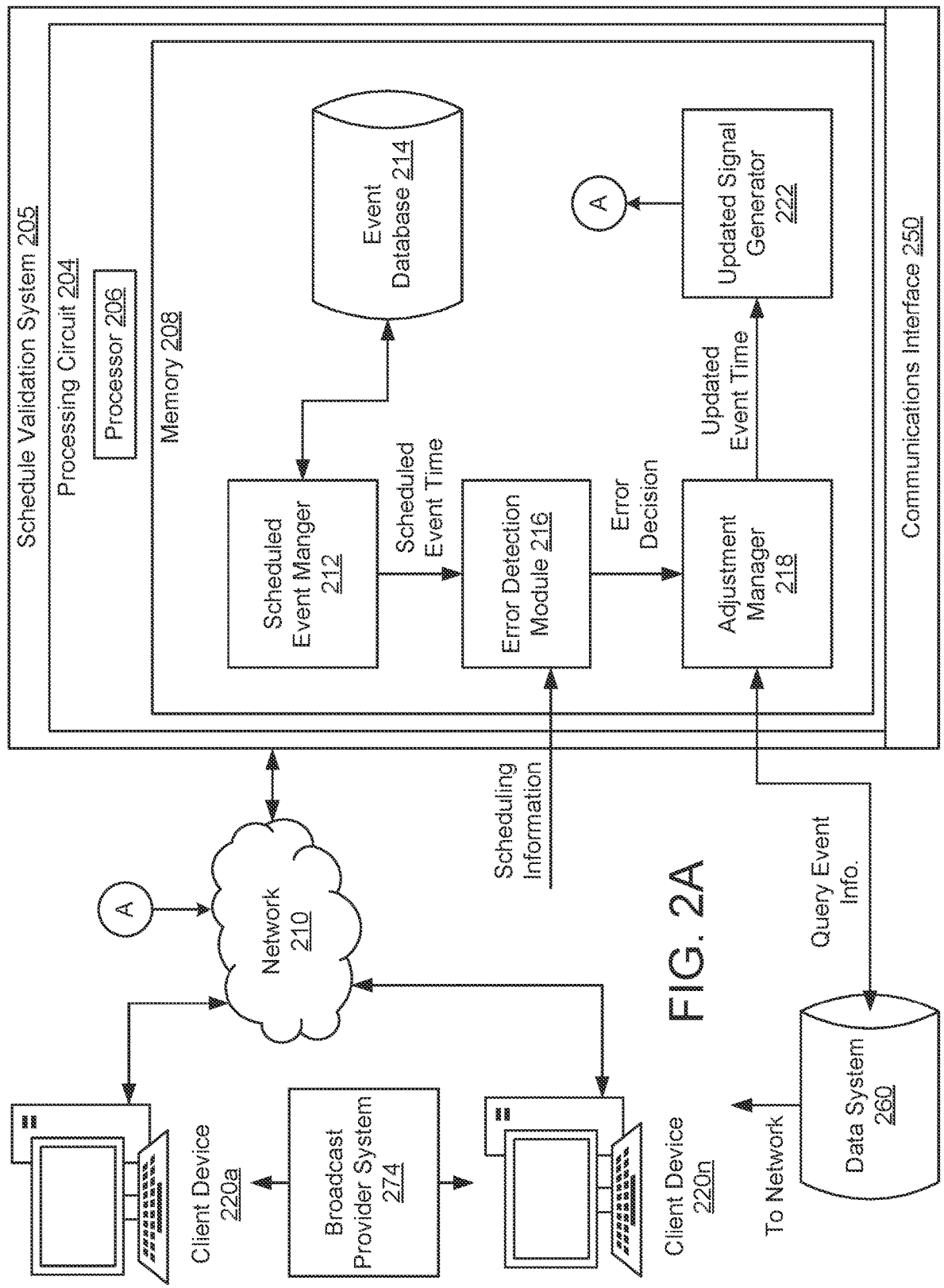
FIG. 2A is a block diagram of a server-side schedule validation system, which can be implemented in the networks of FIGS. 1A-B, according to some embodiments.

Referring now to FIG. 2A, a block diagram of a server-side schedule validation system is shown, according to exemplary embodiments. FIG. 2A is shown to include schedule validation system 205, network 210, client devices 220*a-n*, one or more data system 260 (sometimes referred to herein as "data source(s) 260"), and broadcast provider system 274. In some embodiments, FIG. 2A shows a diagram for updating selection policies (e.g., policies for when notifications, alerts, or interactive content items including wager events, etc.) provided to players viewing a broadcast event (e.g., sporting event, poker event, etc.) on a display device (e.g., cable box, set top box, television, smartphone, etc.). In some embodiments any of the broadcast receiver devices described herein (e.g., cable boxes, etc.), may be configured to display content provided by broadcast provider system 274 (e.g., cable companies, etc.).

Network 210 can include computer networks such as the Internet, local, wide, metro or other area networks, intranets, satellite networks, other computer networks such as voice or data mobile phone communication networks, and combinations thereof. Schedule validation system 205 of system 200 can communicate via network 210 (e.g., with the schedule validation system 205, etc.). The network 210 may be any form of computer network that can relay information between schedule validation system 205, broadcast provider system 274, and one or more information sources, such as web servers or external databases, amongst others. In some implementations, network 210 may include the Internet and/or other types of data networks, such as a local area network (LAN), a wide area network (WAN), a cellular network, a satellite network, or other types of data networks. Network 210 may also include any number of computing devices (e.g., computers, servers, routers, network switches, etc.) that are configured to receive and/or transmit data within the network 210. Network 210 may further include any number of hardwired and/or wireless connections.

Any or all of the computing devices described herein (e.g., schedule validation system 205, broadcast provider system 274, etc., etc.) may communicate wirelessly (e.g., via Wi-Fi, cellular, radio, etc.) with a transceiver that is hardwired (e.g., via a fiber optic cable, a CAT5 cable, etc.) to other computing devices in network 210. Any or all of the computing devices described herein may also communicate wirelessly with the computing devices of network 210 via a proxy device (e.g., a router, network switch, or gateway). In some implementations, network 210 can be similar to or can include network 104 or cloud 108 described above with reference to FIGS. 1A-B. In some implementations, the client devices 220 (which may be cable boxes, set top boxes, etc.) can communicate with other computing devices on the network 210 via the broadcast provider system 274. For example, the client devices and the broadcast provider system 274 may communicate via a propriety access network, such as a cable access network or other forms of broadband Internet access. Communication between the client devices 220 and broadcast provider system 274 may be at least in part subscription based, in some embodiments.

Schedule validation system 205 is shown to include processing circuit 204 (including processor 206 and memory 208) and communications interface 250. Processing circuit 204 can be communicably connected to communications interface 250 such that processing circuit 204 and the various components thereof can send and receive data via communications interface 250. Processor 206 can be implemented as a general purpose processor, an application specific integrated circuit (ASIC), one or more field programmable gate arrays (FPGAs), a group of processing components, or other suitable electronic processing components.

Communications interface 250 can be or include wired or wireless communications interfaces (e.g., jacks, antennas, transmitters, receivers, transceivers, wire terminals, etc.) for conducting data communications. In various embodiments, communications via communications interface 250 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 250 can include a Wi-Fi transceiver for communicating via a wireless communications network. In another example, communications interface 250 can include cellular or mobile phone communications transceivers.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 208 can be or include volatile memory or non-volatile memory. Memory 208 can include database components, object code components, script components, or any other type of information structure for supporting the various activities and information structures described in the present disclosure. According to an example embodiment, memory 208 is communicably connected to processor 206 via processing circuit 204 and includes computer code for executing (e.g., by processing circuit 204 and/or processor 206) one or more processes described herein. In some embodiments, schedule validation system 205 is implemented within a single computer (e.g., one server, one housing, etc.). In various other embodiments schedule validation system 205 can be distributed across multiple servers or computers (e.g., that can exist in distributed locations. Memory 208 is shown to include scheduled event manager 212, event database 214, error detection module 216, adjustment manager 218, and updated signal generator 222.

Scheduled event manager 212 may be configured to receive information (e.g., via a cable company, via a broadcast provider, etc.) indicative of a scheduled broadcast event. For example, a customer of the broadcast provider may watch live broadcast events, such as a baseball game, on client device 220 that are provided by the broadcast provider system 274. Scheduled event manger 212 can receive information from the broadcast provider system 274 indicating that the baseball game begins at 8:00 pm that night. This information can be part of a broadcasting schedule for one or more channels provided by the broadcast provider system 274. In some implementations, the information relating to a scheduled broadcast event is stored in event database 214. The scheduled event manager 212 may query event database to receive information relating to the broadcast events, such as event times, broadcasting information, and content information (e.g., advertisement times, etc.). Scheduled event manager 212 may be configured to provide scheduled event information (e.g., the time of the broadcast event, etc.) to error detection module 216.

The event database 214 can store or maintain data records or data structures that map corresponding live events (e.g., any current, upcoming, or previous live events) with corresponding scheduling data. The scheduling data maintained by the event database 214 may be stored or updated by the schedule validation system 205 in response to detecting scheduling changes. For example, as described herein, the scheduled event manager 212 may receive initial start times or initial durations for a live event from the broadcast provider system 274. The broadcast provider system 274 may maintain its own schedule for live events that corresponds to a respective broadcast schedule. However, the schedule maintained by the broadcast provider system 274 is not updated in real-time, and therefore may not reflect up-to-date start times of live events. The event database 214 solves this issue by providing the client devices 220 with up to date scheduling information for live events. The data structures corresponding to each live event can include one or more fields or tags that include any initial start times, updated start times, or indications of scheduling errors, or any other information related to the live events as described herein. In maintaining up-to-date scheduling information, the event database 214 synchronizes information across various computing systems, while behaving as an intermediary system. When updated information is received from other computing systems, the schedule validation system 205 (or the components thereof) can standardize the information in the format of the event database 214.

The components of the schedule validation system 205 can determine which scheduling information is more accurate (e.g., up-to-date) when a conflict occurs based on a source of each schedule. For example, each source of scheduling information (e.g., the broadcast provider system 274, one or more data sources 260, etc.) may each be assigned a priority score. Each entry for each live event in the event database 214 can include a field indicating the source of the current scheduling information for the live event and the corresponding priority score. When updating the schedules for a live event, the schedule validation system 205 can compare the priority score of the currently maintained scheduling information for the live event with the priority score of the source of information of the purported updated schedule for the live event. If the priority score for the purported updated information is greater than the currently maintained information, and the updated schedule information is different from the currently maintained schedule for the live event, the schedule validation system 205 can replace schedule for the live event (and the source and priority score entries) with the updated information. In contrast, if the priority score for the source that provided the purported updated information is less than the priority score of the currently maintained information, the schedule validation system 205 may not update the entry in the event database 214 with updated information.

The data sources 260 may be any type of data source that can provide updated scheduling information. For example, the data sources 260 can include computing devices or database of third-parties, first-parties (e.g., the same party that maintains the schedule validation system 205, etc.), or from other computing devices that can provide information to the schedule validation system 205. Each of the data sources 260 can be assigned a priority score, which can be proportional to the accuracy of the respective data source 260. The priority scores may be assigned to the data sources 260, any may be transmitted to the schedule validation system 205 for use in the techniques described herein. The priority scores may be provided to the schedule validation system 205 by a trusted computing system (not pictured) that is responsible for assigning priority scores to respective data sources 260. In some implementations, when querying one or more data sources 260, the schedule validation system 205 may query a predetermined number of top priority (e.g., when ranked in order of priority score, etc.). The schedule validation system 205 can receive and maintain a list of data sources 260 to query, where each entry in the list includes a corresponding priority score for the data source 260. In some implementations, the data sources 260 can include mobile devices of agents or individuals that are associated with the schedule validation system 205, who may be on-site at various live events and can therefore provide up-to-date information. In some implementations, one of the data sources 260 may be a server or computing device operated by Sportradar AG, of St. Galen, Switzerland.

Error detection module 216 may be configured to receive scheduled event information and one or more updates from a system, such as the data system 260 and determine whether the initial schedule for the live event is accurate. For example, scheduled event manager 212 provides the time and date for an upcoming baseball game—this Friday at 7:00 PM CT—to error detection module 216. Error detection module 216 also receives a signal from the data source 260 that the baseball game is going to be delayed by an hour due to weather issues. As such, error detection module 216 can determine that the initial schedule information provided to the scheduled event manager 212 is now invalid. When determining the presence of an error, the error detection module 216 may access or query the data system 260 to retrieve updated information for each upcoming live event in the event database 214. The error detection module 216 can compare any updated scheduling information received from the data source 260 to the fields in the event database 214 corresponding to the initial start time for the live event.

Figure 3A:
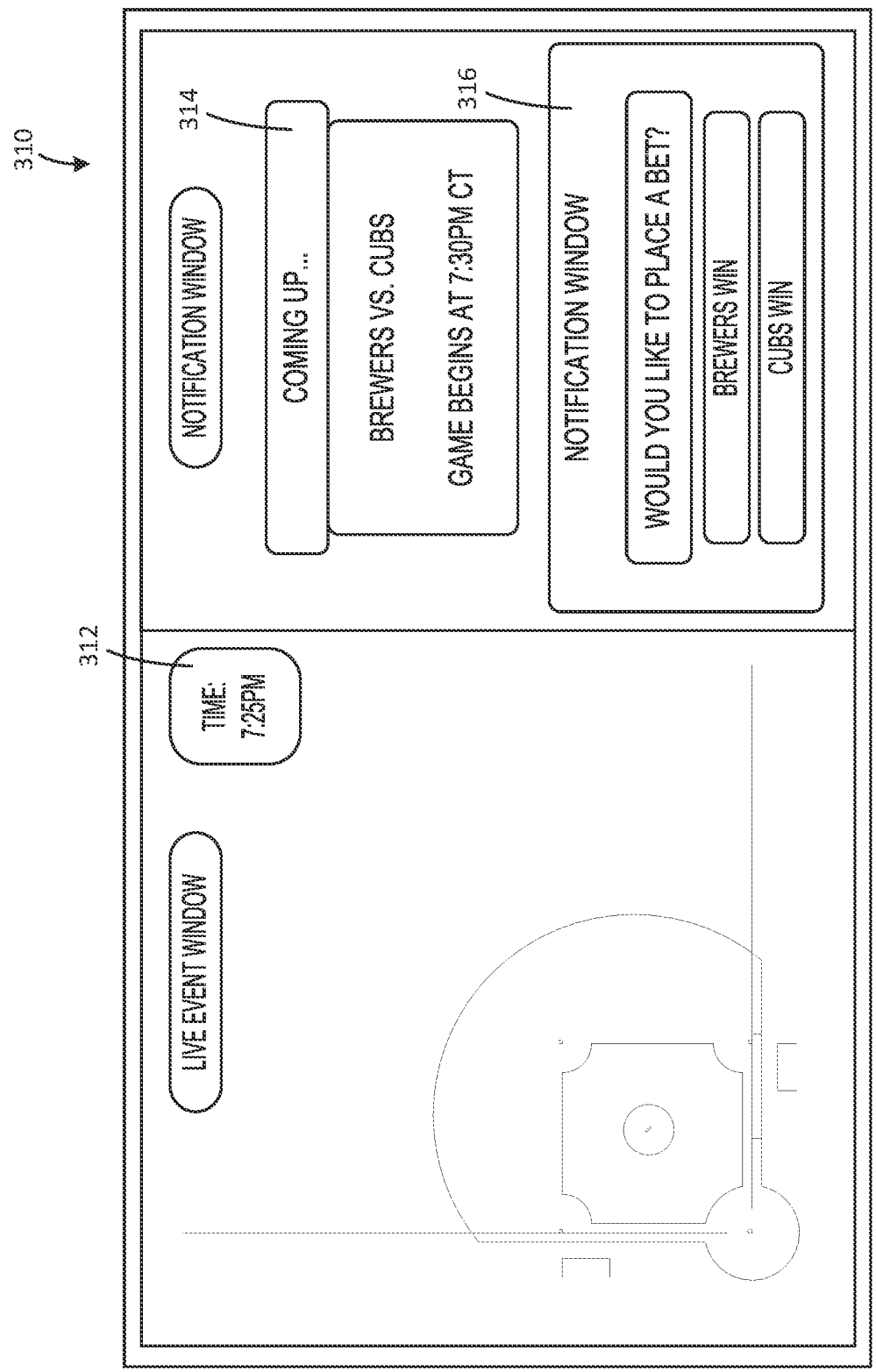
FIG. 3A is a diagram of an interface displaying content information for a broadcast event, which can be displayed on devices within the schedule validation systems of FIGS. 2A-B, according to some embodiments.
Figure 3B:
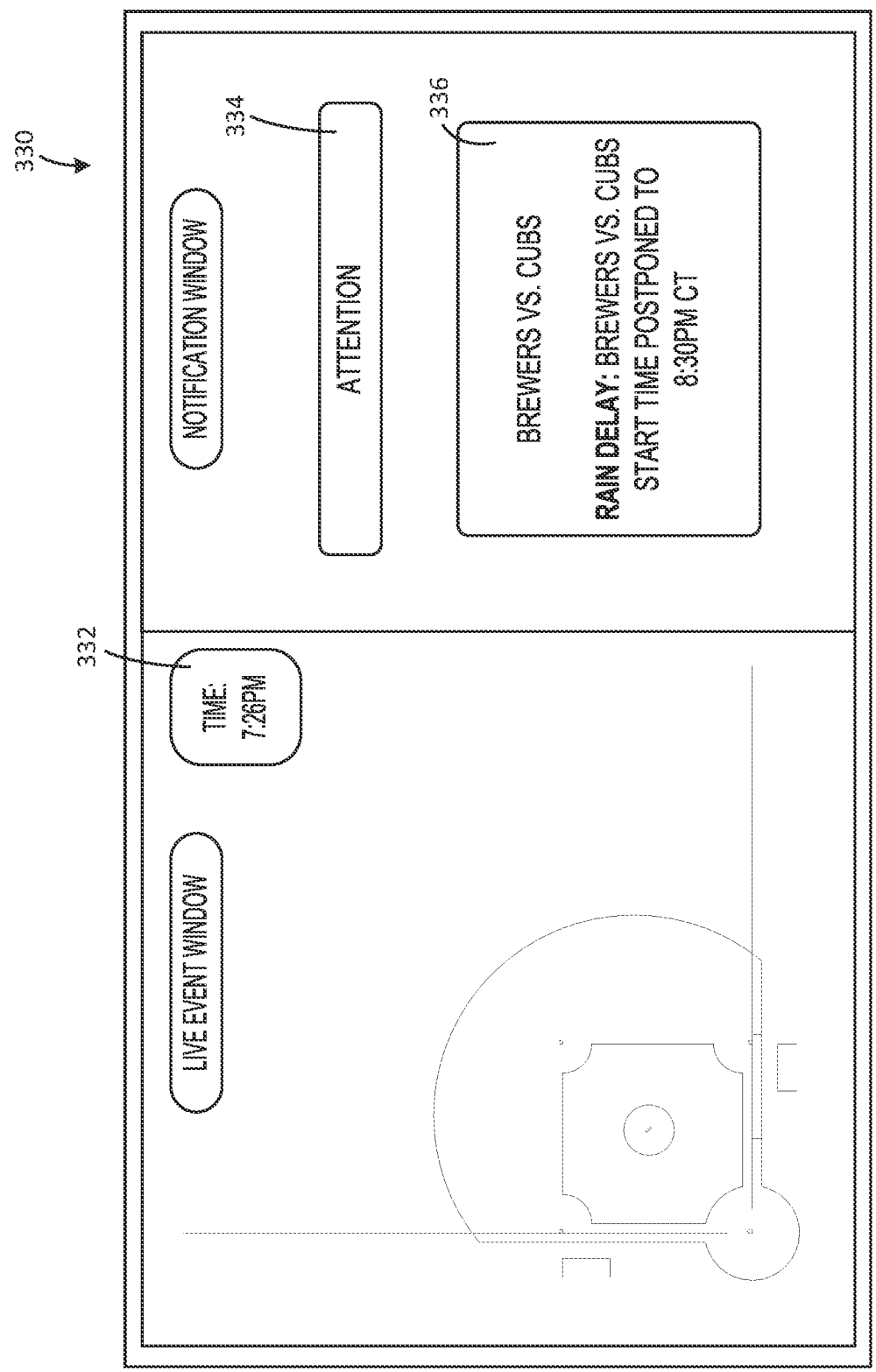
FIG. 3B is a diagram of an interface displaying content information for a broadcast event, which can be displayed on devices within the schedule validation systems of FIGS. 2A-B, according to some embodiments.
Figure 3C:
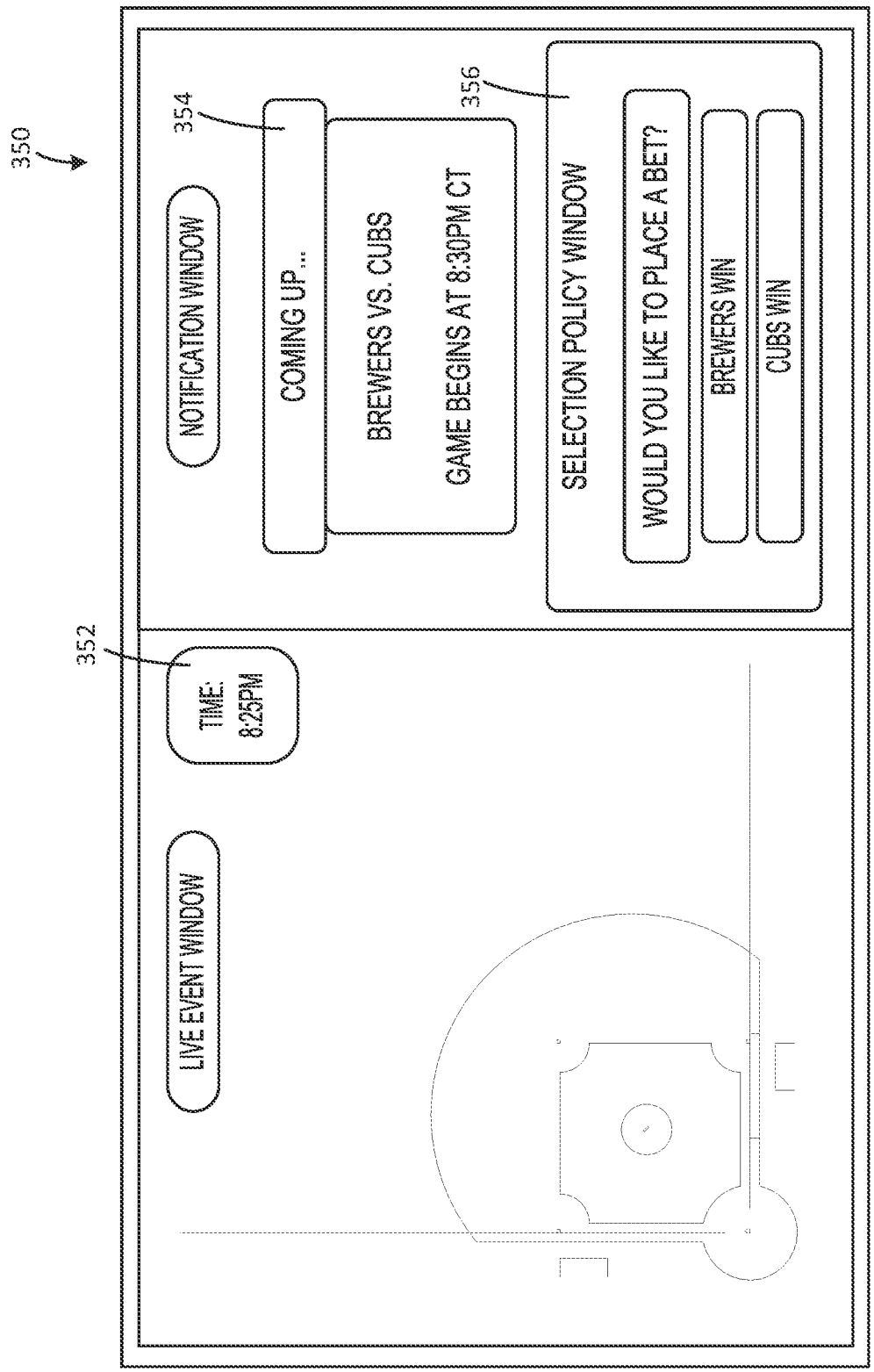
FIG. 3C is a diagram of an interface displaying content information for a broadcast event, which can be displayed on devices within the schedule validation systems of FIGS. 2A-B, according to some embodiments.

Certain selection policies can include instructions to provide notifications, alerts, or interactive content (e.g., advertisements, betting options, etc.) to the customer on client device 220 shortly before the event is broadcasting (e.g., 30 minutes before, 15 minutes before, etc.), or with the broadcast of the live event as shown in FIGS. 3A-3C. In some implementations, error detection module 216 can request updates for live events from the data source 260 periodically, or within a predetermined time period of the initial start time of the live events to determine whether any updates are present. Thus, after error detection module 216 determines that the initial schedule information provided by schedule event manager 212 is invalid, an adjustment to not only the updated start time for the live event, but also to the time in which the selection polices provide notifications, alerts, or interactive content to the customer, may be required. This is described in greater detail below.

In some embodiments, error detection module 216 is configured to provide an adjustment signal to adjustment manager 218. In some embodiments, error detection module 216 is configured to detect that an error in scheduling has occurred, and adjustment manager 218 is configured to perform the adjustment necessary to resolve the error. For example, adjustment manager 218 may query the data system 260 to receive data regarding the new scheduling information.

In a general embodiment, schedule validation system 205 is a separate processing system from the broadcasting provider system 274 (e.g., service providers such as DISH, DIRECT TV, XFINITY, ETC.). For example, the schedule validation system 205 can provide notifications, alerts, and interactive content in accordance with selection policies to client devices 220a-220n at appropriate times, rather than providing broadcasted events (as a cable company may do). To facilitate this, schedule validation system 205 may utilize methods for verifying the times of events for which the selection policies are being provided for. This can ensure that the appropriate selection polices are being provided at the appropriate times and dates, despite changes in scheduling for the broadcasted events.

As such, in some embodiments, adjustment manger 218 may query data sources, such as the data source 260, for information about the event to determine whether the initial time of the scheduled event needs to be adjusted and/or to adjust the time from the initial and now-incorrect time to the correct time. For example, schedule validation system 205 may want to verify the start time for an upcoming baseball game. The adjustment manager 218 can query a database storing the official start times of Major League Baseball games to determine if any rain delays have occurred for the baseball game. In response to determining that rain delay has occupied, adjustment manager 218 may query the database (e.g., data system 260 as shown in FIG. 2A) to determine the new start time or duration for the event, and provide that information to updated signal generator 222. Of course, any variety and/or number of databases can be queried by schedule validation system 205. While not currently shown, schedule validation system 205 may include methods for systematically searching one or more databases to determine an updated start time for an event, a duration time of the event, an end time of the event, or any combination thereof.

Updated signal generator 222 may be configured to receive updated event times from adjustment manager 218 and update the selection policies associated with the live event. The updated selection policies can be implemented by the schedule validation system 205 to provide notifications, alerts and interactive content (e.g., wager opportunities) to one or more client devices 220a-n via network 210 or via the broadcast provider system 274. For example, at 6:15 PM scheduled validation system 205 may be configured to provide selection policies to the interface of client device 220a, 15 minutes before the start time of an event initially scheduled for 8:00 PM. After schedule validation system 205 determines that the start time or duration of the event was updated to 10:00 PM, updated signal generator 222 may be configured to refrain from providing the selection policies at 7:45 (15 minutes before the original start time), and instead provide the selection policies at 9:45 PM.

In some embodiments, the selection policies described herein may be policies for providing certain and/or selective content to client devices at certain times. For example, schedule validation system 205 can provide notifications, alters, and/or wager content items to the client devices in accordance with the selection policy. For example, the schedule validation system 205 may detect a condition to send content to a client device in accordance with receiving an updated schedule.

Figure 2B:
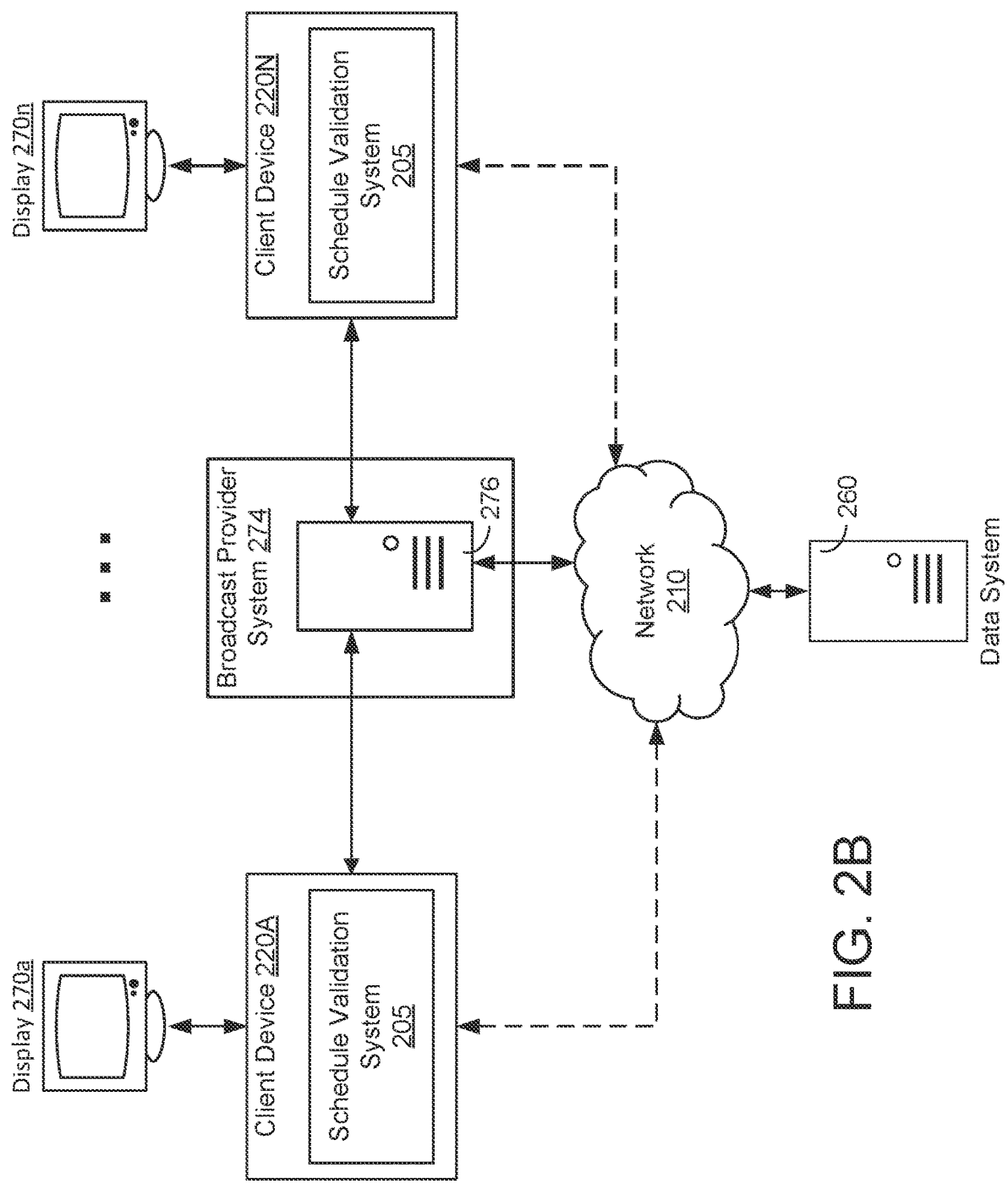
FIG. 2B is a block diagram of a client-side schedule validation system, which can be implemented in the networks of FIGS. 1A-B, according to some embodiments.

Referring now to FIG. 2B, a block diagram of a client-side schedule validation system is shown, according to some embodiments. The system and components shown in FIG. 2B may be similar in functionality to those described in FIG. 2A, but may perform more processing and/or storage on-site (e.g., at or near the client device) as opposed to on an off-premise server (e.g., communicably connected to the client device over a network, as shown in FIG. 2A, etc.). FIG. 2B is shown to include displays 270a-n, client devices 220a-n, schedule validation system 205, network 210, data system 260, and broadcast provider system 274.

Display 270a may act as a display or presentation interface for client device 220a. For example, display 270a may present broadcast events provided to client device 220a from broadcast provider 274, and/or notifications, alerts, or interactive content items provided by schedule validation system 205 in accordance with the selection policies. Similarly, display 270n may present events based on one or more selection policies for client device 220n. As shown, in FIG. 2B, schedule validation system(s) 205 are housed within 220A in some embodiments. For example, client device 220A is a cable box located proximate to display 270a that houses the one or more processing components of schedule validation system 205 therein.

Broadcast provider system 274 is shown to be communicably coupled to client devices 220a-n and network 210. In some embodiments, the client devices 220a-n are configured to receive information from broadcast provider system 274 directly. For example, schedule validation system 205 within client device 220A receives a signal from database 276 within broadcast provider system 274 indicative that a broadcast event is beginning at 7:00 PM (e.g., an initial schedule). In other embodiments, client devices 220a-n can communicate with broadcast provider system 274 via network 210. Additionally, data system 260 is shown to be communicably connected to network 210. While the systems and methods disclosed herein may generally show certain communication connections between network components (e.g., data system 260 to network 210 to broadcast provider system 274, etc.), these connections are merely meant to be exemplary and should not be considered limiting. A combination and/or variation of the network topologies disclosed in FIGS. 2A-B can be considered.

Broadcast provider system 274 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. Broadcast provider system 274 can include one or more computing devices or servers that can perform various functions as described herein. Broadcast provider system 274 can include any or all of the components and perform any or all of the functions of the computer system 100 described herein in conjunction with FIGS. 1A-1D. Broadcast provider system 274 can include similar features and functionality of the client devices 102 or the servers 106 described herein above in conjunction with FIGS. 1A-1D.

Broadcast provider system 274 can be implemented using hardware or a combination of software and hardware. In some implementations, broadcast provider system 274 can be configured to provide cable services. The cable services can be provided via a cable distribution network or over network 210. A cable distribution network can connect the distribution source (e.g., broadcast provider system 274) to the equipment of a player (e.g., broadcast receiver 220). In some implementations, the connection can be a hard-wired cable network utilizing coaxial, twisted-pair, and fiber-optic, among others. In various implementations, the connection can be a wireless network utilizing a mobile network (e.g., 4G, 5G, 6G), and satellites, among others. The broadcast provider system 274 may maintain and provide a schedule of upcoming broadcast events to the schedule validation system 205.

Additionally, in some implementations, broadcast provider system 274 can include an input device that couples and communicates with the various computing devices described herein. For example, broadcast provider system 274 may be configured to relay data received from the client devices 220, or other client computing devices, to the schedule validation system 205. In another example, broadcast provider system 274 may receive instructions from the schedule validation system 205 and subsequently communicate with each client device 220 that is identified in the instructions. The instructions can be, for example, display instructions, that cause content (e.g., the content items described in greater detail herein below) to be displayed in connection with broadcast content provided by broadcast provider system 274. Some example interfaces of live broadcast content being displayed in connection with notifications, alerts, or other content is shown in FIGS. 3A-C. The notifications, alerts, and other content displayed with live broadcast content can be received, selected and/or generated by the schedule validation system 205 based on, for example, a player profile to access one or more features of an application executing on the client device 220.

In some implementations, broadcast provider system 274 can further provide broadcast content via digital or analog television signals, or otherwise encoded signals via a proprietary network, to the client devices 220. Broadcast provider system 274 may communicate with client devices 220, such as more cable boxes, set top boxes, or other types of devices that can receive broadcast content. Broadcast provider system 274 may communicate with the client devices 220 via a cable network (e.g., via one or more cable modem termination systems, etc.). In some implementations, broadcast provider system 274 can communicate with the client devices 220 via a hybrid fiber-coaxial infrastructure that delivers broadcast content or broadband services. In some implementations, broadcast provider system 274 may communicate with the client devices 220 via a fiber-optic network infrastructure that can deliver broadcast content or broadband services. In such implementations, the client devices 220 can be, or may include, optical network termination units or gateways. In some implementations, broadcast provider system 274 may transmit broadcast content data (and in some implementations, instructions received from the schedule validation system 205) via one or more satellites. In such implementations, the client devices 220 may be communicatively coupled to one or more satellite receiver dishes, and can receive the information transmitted by broadcast provider system 274 via transmissions from the satellites. Broadcast provider system 274 may communicate via one or more communication interfaces with any such proprietary broadcast network or broadband service network to provide broadcast content or display instructions received from the schedule validation system 205 as described herein.

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can include similar features and functionality of client devices 102 described herein above in conjunction with FIGS. 1A-1D.

Each client device 220 can include, but is not limited to, a cable box (cable converter box, or television converter box), a set-top box, a satellite receiver, a special-use PC Card device (e.g., CableCard, AllVid), a television device, a mobile device, or another type of computing device. Cable boxes can convert digital television signals to analog or digital signals that can be decoded and displayed by a television, or unscramble a television signal provided by broadcast provider system 274 or the schedule validation system 205. Set-top boxes can enable a television, or another type of display device to receive and device digital television (DTV) broadcasts. A satellite receiver can be a computing device that can be configured to receive and decode radio signals from one or more satellites, which can then be converted into a format that is useable for a television display. Generally, the cable boxes, set-top boxes, and satellite receivers can be tuning devices that can transpose or convert channels from a cable television service (e.g., provided by broadcast provider system 274 or schedule validation system 205) to an analog or digital radio frequency (RF) signal. In some implementations, each client device 220 can be a television or another type of computing device with a converter integrated within the client device 220 (e.g., within a same enclosure).

Each client device 220 can be implemented using hardware or a combination of software and hardware. In some implementations, each client device 220 can be configured to receive cable services from the broadcast provider system 274. In various implementations, a client device 220 can include a display or display portion. Alternatively, the client device 220 can be configured to provide a converted signal for display on a display device such as a television or a monitor. The display can include a display portion of a television, a display portion of a computing device, a graphical user interface (GUI), or another type of interactive display (e.g., a touchscreen, a display, etc.) and one or more input/output (I/O) devices (e.g., a remote, a mouse, a keyboard, a digital keypad, a gamepad, etc.).

The display can include one or more portions, for example, to display broadcast content and at least one application displayed in addition to the broadcast content. The display can include a touch screen displaying an application, such as live event windows and/or notification windows described herein. The display can include a border region (e.g., side border, top border, bottom border). In some implementations, the display can include a touch screen display, which can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. In some implementations, a player (e.g., a user of the broadcast receiver device) can interact with actionable objects provided in notifications, alerts, or content using a remote, a gamepad, or some other type of controller that allows selection of user interface elements presented in an application executing on the client device 220. Each client device 220 can include an input device (e.g., a remote, a gamepad, a controller, a keyboard, a mouse, a touchscreen, etc.) that couples or communicates with each client device or the display of each client device to enable a player to interact with and/or select one or more actionable objects (e.g., interactive user interface elements, etc.) as described herein. The display can enable interaction with one or more visual indications provided through the display of each client device 220, and responsive to an interaction (e.g., select, click-on, touch, hover), the client device 220 can generate an indication identifying a user input and/or selection of a notification, alert, or an actionable object (e.g., button, selectable content, hyperlink, a user interface element, etc.), among others.

In some implementations, each client device 220 can convert digital television signals to analog signals and/or unscramble a television signal. Upon converting and/or unscrambling the digital television signal, the client device 220 can provide an output to the client device 220 display and/or client device 220. For example, the client device 220 may be an all-in-one computing device configured to receive and configure signals (e.g., from the schedule validation system 205) and can be configured to display (or stream) content of the television signals on an integrated display of the client device 220. For example, the client device 220 may be a television, a smart television, and/or an internet enabled device with a display, among others. In another example, the client device 220 may be a cable box (or set-top box) configured to receive and configure signals (e.g., from the broadcast provider system 274) and can be configured to display (or stream) content of the television signals on an integrated display of the broadcast receiver device and/or a client device.

In some implementations, the client device 220 may be a computer-enabled television (sometimes referred to herein as a "smart television") that receives decoded broadcast content via a set top box, cable box, or a computing device that receives broadcast satellite signals (a "satellite box"). In such implementations, the client device 220 can receive and display broadcast content provided by the broadcast provider system 274 via the cable box, set top, or satellite box. The client device 220 can execute one or more applications, which may be associated with as the schedule validation system 205 described in greater detail herein below. The application executing on the client device 220 can establish one or more communication sessions with the schedule validation system 205 via the network 210. The application(s) can receive instructions to display notifications as described herein from the schedule validation system 205, which may be presented on one or more user interfaces with the broadcast content received via the cable box, set top box, or satellite box. In such implementations, the client device 220 can communicate with the cable box, set top box, or satellite box to perform one or more actions, such as schedule or modify a recording, or to change to a different broadcast channel.

For example, in some implementations, the instructions provided by the schedule validation system 205 can include instructions to present actionable objects which, when actuated, cause the client device 220 to navigate to and display broadcast content different from broadcast content currently being displayed. To do so, the smart television (e.g., the client device 220), upon detecting the actuation, may communicate a request to the cable box, set top box, or satellite box to navigate to broadcast content identified in the instructions. For example, the instructions may identify a particular channel or channel(s) on which the broadcast content is being displayed. The client device 220 (or the application executing thereon) can send a request to the cable box, set top box, or satellite box to navigate to the identified channel. In some implementations, the application executing on the smart television (e.g., the client device 220) can communicate with the broadcast provider system 274 to request a schedule (e.g., an initial schedule from the broadcast provider system 274 or an updated/corrected schedule from the schedule validation system 205) corresponding to the player associated with the cable box, set top box, or satellite box. Using the initial schedule in the operations described herein, the application executing on the client device 220 can identify the specific channel on which the broadcast content identified in the instructions is being provided. Once the channel is identified, the client device 220 can transmit a request to the cable box, set top box, or satellite box to navigate to and display the channel. The client device 220 can communicate with the cable box, set top box, or satellite box via any number of communication protocols, such as a Bluetooth protocol, a WiFi protocol (e.g., web-sockets), or any other type of communication protocol.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can execute a client application, which can be a live event application that communicates with the schedule validation system 205 to view notifications, alerts, or additional content, with broadcast content displayed by the client device 220. The client application can include a user application executing on each client device 220 or provided to the client device 220 by a server (e.g., the schedule validation system 205, one or more servers 106, etc.).

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or servers. In some implementations, the application can access or identify the player profiles 255, the interactions 260, or the historic live events 265, or the content items, stored and maintained at the database 225. The application can present one or more notifications, alerts, or interactive content items, which can include one or more actionable objects, such as the actionable objects described herein below in conjunction with FIGS. 3A-3C, to a player through a client device 220. Such actionable objects can include user-selectable hyperlinks, buttons, graphics, videos, images, user interface elements, or other application features that generate a signal that is processed by the application executing on the respective client device 220.

In some implementations, the client devices 220 can establish one or more communication sessions with the schedule validation system 205, for example, via the broadcast provider system 274. In implementations where the client devices 220 communicate with the schedule validation system 205 via broadcast provider system 274, the client devices 220 can communicate messages to and from the schedule validation system 205 via the proprietary communication network of broadcast provider system 274. Broadcast provider system 274 can then relay those messages to and from the schedule validation system 205 to facilitate communication (or a communication session) between the client devices 220 and the schedule validation system 205. The one or more communication sessions can each include a channel or connection between the schedule validation system 205 and the one or more client devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access information resources, such as web pages via a web browser, or application resources via a native application executing on a client device 220. When accessing information resources, the client device 220 can execute instructions (e.g., embedded in the native applications, in the information resources, etc.) that cause the client devices 220 (or client devices 225) to display event interfaces with broadcast content received from broadcast provider system 274, such as the event interfaces described herein below in conjunction with FIGS. 3A-3C. The live event application interfaces can be, for example, application interfaces that present different types live event, notifications, alerts, content items, or other types of interactive content. In general, the content items can include content (e.g., images, video, animations, graphics, audio, etc.) that can be presented to a player via the input/output interfaces of a display device forming a part of or in communication with the client device 220 executing the application. The application executing on the client device 220 can receive instructions to display notifications, alerts, content items, or other information from the schedule validation system 205 as described herein. The application can parse the instructions and execute or otherwise carry out the operations specified in the instructions to display the notifications, alerts, content items, or other information from the schedule validation system 205.

The client device 220 (or an application executing on the client device 220) can receive instructions to display a notification, an alert, an interactive content item such as those described herein below in connection with FIGS. 3A-3C, or other additional content, from the schedule validation system 205. In some implementations, the instructions can include data relating to broadcast content. The data relating to broadcast content can include one or more identifiers of broadcasts of live events, or one or more attributes (e.g., wager statistics, odds, potential payout amounts, current wager amounts, aggregate wager amounts on one or more events, upcoming or current critical events or moments, fantasy lineup information in a player profile associated with the broadcast receiver device, event information, etc.) relating to those live events. Event information can include one or more data structures that include any information related to an event (e.g., a historic, current, or upcoming event, etc.) such as an event time, event score (e.g., in the case of sporting events, score of one or more teams or players of the event, etc.), wager information (e.g., information about wager opportunities, information about ongoing wagers), information about whether the player has indicated a desire to wager in similar scenarios (e.g., previous activity), or other event information described herein. In some implementations, the event information can be updated in real-time on the client device 220 (or client devices 225) as the live event occurs (or progresses) (e.g., as the event is processed by the live event system 205 according to the content items and transmitted to the client devices 220, etc.).

The indications of event information can include instructions that cause the client device 220 to display one or more notifications, alerts, or content items. This additional content can be selected by the schedule validation system 205 based on various attributes of a player profile associated with a client device 220, including wager opportunities based on current in game events (e.g., elapsed time, player statistics, team statistics, game statistics, etc.) historical activity data of the player profile, or historical live events accessed or interacted with by the player profile, among others. The client devices 220 can receive instructions from the live event system 205 that can cause the client device 220 to display the notifications, alerts, or content items, which can one or more actionable objects, such as the actionable objects described herein below in conjunction with FIGS. 3A-C.

As described herein, a client device 220 can receive one or more interactions with actionable objects presented on the display of the client device. Interactions can be selections (e.g., made with a remote, a gamepad, a controller, or other input device, etc.) tap interactions, click interactions, or other types of indications that a player is engaged with a particular user interface element. A signal can include any information specified by the instructions associated with the particular actionable object with which the user interacted. The signals can include, for example, an interaction indication, which can provide any information relating to the user interface element with which the user interacted (e.g., a wager, a selection of a notification to navigate to other broadcast content, selection of a notification to record broadcast content, a request to view a live event associated with a current or potential wager, etc.).

As described herein, a client device 220 and the schedule validation system 205 can exchange messages directly containing information that causes an interactive live event interface to be displayed on the display of the client device 220. By interacting with the actionable objects presented on the display of the client device 220, the schedule validation system 205 can provide instructions to display notifications, alerts, and interactive content items to a client device 220, which causes the client device 220 (or the application executing on the client device 220) to change the user interface to display the notifications, alerts, and content items with broadcast content such as a live event. In some implementations, the client devices 220 (or the application executing on the client devices 220) can display said notifications, alerts, and content items in accordance with a notification display policy, a notification transmission policy, a notification generation policy, or other policies that allow or restrict the display of notifications, alerts, or content items. In some implementations, the client device 220 can receive content for presentation on the display of the display device in a streaming arrangement (e.g., content is streamed from the schedule validation system 205 using a streaming protocol, etc.).

Referring generally to FIGS. 3A-C, several diagrams of a broadcast event (e.g., a baseball game, etc.) displayed on an interface are shown, along with variations of update windows and content provided on the interface based on selection policies, according to some embodiments. The diagrams shown in FIGS. 3A-C may be provided on interface of any of the client devices described herein, such as display 270a of client device 220a.

Referring now to FIG. 3A, window 310 is shown, according to some embodiments. Window 310 may be shown on any interface of display 270a-n, in some embodiments. Window 310 is shown to include time window 312, update window 314, and notification window 316. Window 310 may be presented to a customer prior to a scheduled broadcast event, such as one hour before, 20 minutes before five minutes before, etc. As shown in FIG. 3A, the broadcast event—in this embodiment, a baseball game—begins at 7:30 PM CT, and the current time, according to time window 312, is 7:25 PM CT (i.e., five minutes before the scheduled game time). At this time, notification window 316 is provided to the user (e.g., via schedule validation system 205, etc.).

The notification window may provide the option to a customer viewing window 310 to place a bet on which baseball team will win the game. The customer can select an option (e.g., by clicking on an option using a television remote, etc.) and secure their bet prior to the start of the baseball game. Advantageously, following the example described above, verifying the start time of the broadcast event can ensure that betting offers for the baseball game are not being provided after the baseball game has already started.

Referring now to FIG. 3B, window 330 is shown, according to some embodiments. Window 330 may be shown on any interface of display 270a-n, in some embodiments. Window 330 is shown to include time window 332, attention window 334, and notification window 336. In some embodiments, schedule validation system 205 determines that a rain delay has occurred for the broadcast event. In response to this, schedule validation system 205 provides an update to window 330, showing that the baseball game is postponed to 8:30 PM CT due to a rain delay.

As mentioned above with respect to FIGS. 2A-B, this may have been determined by querying data system 260 to detect that a rain delay had occurred for the broadcast event. While FIG. 3B shows time window 330 occurring one minute after window 310, this is merely meant to be exemplary and should not be considered limiting. In some embodiments, window 330 showing updates to the times of the broadcast events can occur at any point prior to or during the broadcast event.

Referring now to FIG. 3C, window 350 is shown, according to some embodiments. Window 350 may be shown on any interface of display 270*a*-*n*, in some embodiments. Window 350 is shown to include time window 352, notification window 354, and notification window 356. In some embodiments, window 350 is configured to display the notifications for the updated time of the broadcast event (e.g., as shown in FIG. 3B). The various windows described herein may also be referred to as "content items," which may include interactive elements that cause the client device 220 presenting the content items to perform one or more operations described herein. FIG. 3C shows that the broadcast event has been moved to 8:30 PM CT, and the notification window 356 is now being provided prior to the updated start time (e.g., 8:25 PM CT as shown in time window 352, etc.).

In various implementations described herein, content can be provided to the client devices 220 by the schedule validation system 205 or broadcast provider system 274 in one or more feeds of content. The feeds of content may include content items that indicate updated start times of live events, content items that indicate information relating to wagers placed on the live events, content items relating to wagers placed on the live event (e.g., wagers that identify a player profile associated with the client device, other wagers placed on the live event, etc.), and content items that indicate detected conditions of live events (e.g., changes in score, points, plays that occur during the live events, etc.), among others.

The schedule validation system 205 can detect the outcomes of wagers by monitoring the conditions of the live events identified by the wagers. Detecting the outcomes of wagers can including retrieving or monitoring an external repository that maintains a record of occurrences in the live events or a record of the state of a live event that indicates various conditions of the live events on which wagers can be placed. Detecting the outcomes of wagers can include polling one or more remote computing devices, which may be operated by persons that are present at a live event. In some implementations, user input can be provided at the remote computing devices to indicate an update to a state of the live event, or to indicate an outcome of one or more wager conditions. The indications can be recorded by the remote computing device, which can transmit with the indications to the schedule validation system 205. Based on the indications, the schedule validation system 205 can determine whether one or more wagers have been closed by evaluating the conditions in each wager against the updated state provided by the remote computing device. In implementations where the remote computing devices themselves indicate an outcome of a wager, the schedule validation system 205 can detect the outcome of wagers by parsing the indications. In some implementations, the schedule validation system 205 can detect outcomes wagers based on the changes in the state (e.g., in-game time, score, one or more plays, or status of a live sporting event, etc.) of the live event.

The schedule validation system 205 can update the status of the wagers based on the detected outcomes by recording the outcomes of the wagers in the database. Upon detecting an outcome of a wager, the schedule validation system 205 can generate a content item that includes an indication of the wager outcome, and can display the content item on a client device 220 with a broadcast of a live event, as described herein. In some implementations, the content item can include instructions that cause the client device to navigate to the live event on which the wager was placed (e.g., change the channel being displayed). The outcomes of wagers may also be utilized in connection with the various techniques described herein.

The schedule validation system 205 may receive or update permissions to display one or more content items (e.g., in the user interfaces shown in FIGS. 3A-3C) with live content. For example, the client devices 220 can perform an opt-in process to authorize the display of one or more content items with broadcasts of live events. The opt-in process may include providing a code, which a user of the client device 220 can scan using a second device (e.g., a smartphone, a tablet computer, etc.). Scanning the code can cause the second device to navigate (e.g., via a web-browser or native application deep-link) to a URL embedded in the scanned code. The code including the URL can be generated in response to a corresponding interaction with a button or user interface element presented by the application executing on the client device 220, to initiate the opt-in process. The URL can cause the second device to navigate to a landing page (e.g., a user interface) provided by the schedule validation system 205 that accepts authentication credentials corresponding to a player profile. Once the authentication credentials have been entered, the schedule validation system 205 can verify the authentication credentials, and provide a second page (e.g., a user interface) that enables the user to modify permissions for presenting content with live events on the client device 220 that presented the code. In some implementations, one or more of the landing page that accepts authentication credentials and the second page that enables the user to modify the permissions can be navigated to and displayed on the client device 220.

The second page that enables the user to modify permissions for presenting content with live events on the client device 220 that presented the code can include one or more selectable user interface elements that enables selection of whether content can be displayed in connection with live broadcasts on the client device. The selectable user interface elements can enable or disable the display of certain types of content items (e.g., wagers, messages from other players, etc.). The selectable user interface elements can be used to specify time period restrictions during which content items are not displayed on the client device 220 with live content. The selectable user interface elements can be used to specify time period restrictions during which content items are not displayed on the client device 220 with live content. The updates to the permissions can be stored in association with an identifier of the client device 220, and can form a part of one or more selection policies to select content for the client device 220.

Content items, such as the content items (sometimes referred to as alerts or notifications) shown in FIGS. 3A-3C, can be displayed by an application that executes on the client device 220. As described herein, the client device 220 can include memory that can store processor-executable instructions. The processor-executable instructions can include the application. To launch the application, a player can access a menu provided by an operating system or other low-level software of the client device 220. The menu can include an interactive user interface element that launches the application, or causes the application to present a visible user interface (e.g., one or more of the interfaces described in connection with FIGS. 3A-3C, etc.). Various additional user interface elements can be displayed by the application that enable navigation between different views, windows, content items, or user interfaces of the application.

As described herein, one or more of the content items provided to and displayed by the client device 220 with live content can be interactive content items. The interactive content items can include buttons, hyperlinks, graphics, or other types of interactive user interface elements that cause the client device 220 to perform one or more operations. For example, the content item can include (e.g., in metadata of the content item) processor-executable instructions, interpretable scripts or code, or an identifier of an operation to perform. Upon an interaction with the content item, the client device 220 can perform the various operations specified by the metadata of the content item. Example operations including navigating to a live broadcast indicated in the content item, placing a wager on a live event, modifying player profile attributes, request additional or alternative content to display with a current or alternative broadcast, or other operations described herein. In an example embodiment, upon an interaction with a content item that causes the client device 220 to navigate to a live broadcast, the client device 220 can transmit a request for content items to the schedule validation system 205, which can provide corresponding content items for display with the live broadcast in response to the request. In another embodiment, the client device 220 can navigate to the live broadcast indicated in the content item without requesting content items for display.

Figure 4:
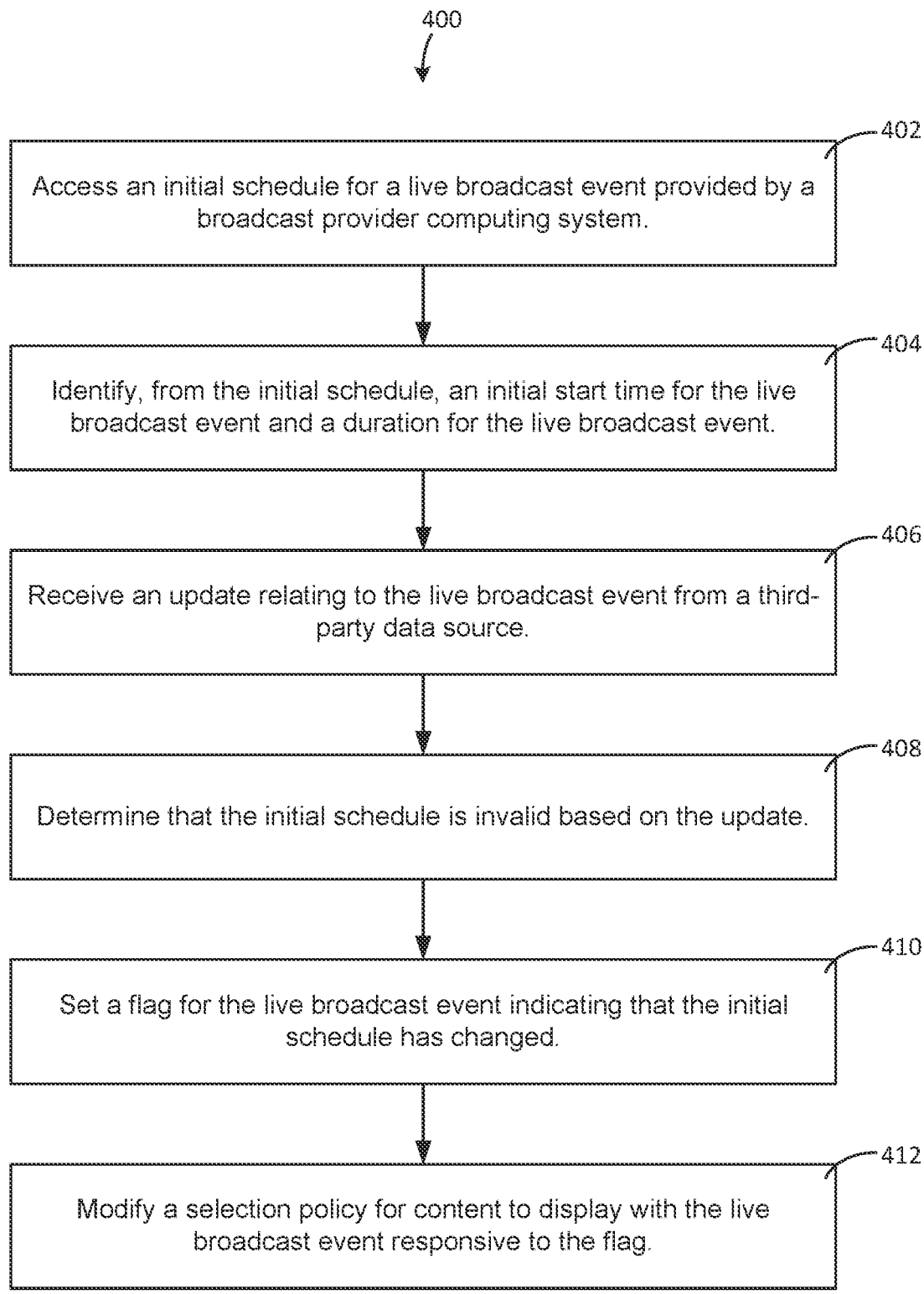
FIG. 4 is a flow diagram of a process for modifying a selection policy for content to display for a broadcast event, according to some embodiments.

Referring now to FIG. 4, a flow diagram of a process 400 for validating times for broadcast events is shown, according to some embodiments. Process 400 may be performed partially or entirely by any of the processing components described herein. For example, process 400 may be performed partially or entirely by schedule validation system 205, and may include any of the foregoing operations.

Process 400 is shown to include accessing an initial schedule for a live broadcast event provided by a broadcast provider computing system (step 402). In some embodiments, scheduled event manager 212 determines and/or receives an initial schedule for a live broadcast event. In some embodiments, this can be received from one or more databases and/or servers associated with the cable company that is providing the broadcast of the event. The initial schedule received may include information such as the channel for which the event is broadcasting on, the time at which the broadcast starts, and/or the data for which the broadcast is scheduled for. In some embodiments, step 402 may be performed at least in part by transmitting a request to broadcast provider system 274 to access the initial schedule for the live broadcast event and subsequently receiving the initial schedule from broadcast provider system 274 responsive to the request.

Process 400 is shown to include identifying, from the initial schedule, an initial start time for the live broadcast event and a duration for the live broadcast event (step 404). In some embodiments, schedule validation system 205 can determine the initial start time for the broadcast event. This can be performed to ensure that notifications (e.g., wager information, etc.) from a selection policy can be scheduled to be provided to the display 270a at appropriate times, according to some embodiments. As mentioned above, the systems and methods disclosed herein are not limited to identifying initial start times for events, and this should not be considered limiting. Halftime times, end-of-quarter times, times for which advertisements will be shown, and other times can also be considered. In some embodiments, step 404 is performed at least in part by identifying the duration for the broadcast event by calculating the duration for the broadcast event based on a difference between an initial end time for the live broadcast event and the initial start time for the live broadcast event.

Process 400 is shown to include receiving an update relating to the live broadcast event from a data source (step 406). In some embodiments, schedule validation system 205 can query a data source to determine whether there is information relating to and updated initial start time. For example, adjustment manager 218 queries data system 260 to determine if a rain delay has occurred and/or if the rain delay has postponed the broadcast event to a specific time/date. These updates from data sources may be provided at the request of schedule validation system 205 and/or may be provided automatically in response to an update to the initial start time of the broadcast event.

Process 400 is shown to include determining that the initial schedule is invalid based on the update (step 408). In some embodiments, schedule validation system 205 determines that the initial start time is different than an updated start time (e.g., where the updated start time was determined by querying a data source, etc.). For example, adjustment manager 218 determines that an initial start time of 7:00 PM for a baseball game is different than the updated start time of 8:30 PM for the baseball game. Adjustment manager 218 then provides this information to updated signal generator 222 such that the scheduling of displaying the notifications of a selection policy may be appropriately updated.

Process 400 is shown to include setting a flag for the live broadcast event indicating that the initial schedule has changed (step 410). In some embodiments, setting a flag may refer to notifying the customer that the broadcast event has been changed (e.g., such as notification window 336 as shown in FIG. 3B), performing an internal processing update within schedule validation system 205, a notification to the broadcast company via network 210, or any combination thereof. Step 410 may be performed at least partially by setting the flag for the broadcast event by transmitting a request to broadcast provider system 274 to modify the initial start time of the live broadcast event according to the update.

Process 400 is shown to include modifying a selection policy for content to display with the live broadcast event responsive to the flag (step 412). In some embodiments, schedule validation system 205 adjusts the time at which the notifications of selection policies are provided to client devices 220a-n, based on the flag. In some embodiments, step 412 is performed at least partially by restricting selection of content for display with the broadcast event until the actual start time of the live broadcast event (e.g., such as notification window 356 as shown in FIG. 3C, etc.).

In some embodiments, step 412 is performed at least partially by identifying, a one or more profiles each having one or more attributes associated with the broadcast event, identifying via the broadcast provider computing system, a subset of the one or more of user profiles corresponding to a respective set of broadcast receiver devices that are displaying content and selecting content corresponding to the broadcast event to display at the respective set of broadcast receiver devices based on the flag.

In some embodiments (not shown), schedule validation system 205 may include processing and/or memory for generating, receiving, and/or storing user profiles. The user profiles may be mapped to different customers that are viewing the broadcast event on client devices 220a-n. In some embodiments, schedule validation system 205 is configured to determine the updated times for certain broadcast events and update the appropriate notification windows by using the respective user profile to the map the broadcast event to the appropriate updated notification window displaying information based on a selection policy.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method, comprising:
    accessing, by one or more processors coupled to memory, an initial schedule for a broadcast of a live sporting event provided by a broadcast provider computing system;
    identifying, by the one or more processors, from the initial schedule, an initial start time for the broadcast of the live sporting event and a duration for the broadcast of the live sporting event;
    receiving, by the one or more processors, from a data source, an update indicating that a schedule for the live sporting event has been modified;
    determining, by the one or more processors, that the initial schedule is invalid based on the update;
    setting, by the one or more processors, a flag for the broadcast of the live sporting event indicating that the initial schedule has changed;
    modifying, by the one or more processors, responsive to the flag, a selection policy for wager recommendations identifying the live sporting event to display with the broadcast of the live sporting event;
    determining, by the one or more processors, that a broadcast receiver device associated with a player profile is presenting broadcast content;
    selecting, by the one or more processors, based on the player profile and the selection policy, responsive to determining that the broadcast receiver device is presenting broadcast content, a content item comprising at least one wager recommendation identifying the live sporting event for display in an application executing on the broadcast receiver device, the content item to be displayed in the application concurrent with the broadcast content; and
    providing, by the one or more processors, the content item to the broadcast receiver device for display, the content item comprising an interactive object that, when interacted with, causes the broadcast receiver device to navigate to the broadcast of the live sporting event.

2. The method of claim 1, wherein accessing the initial schedule for the broadcast of the live sporting event further comprises:
    transmitting, by the one or more processors, a request to the broadcast provider computing system to access the initial schedule for the broadcast of the live sporting event; and
    receiving, by the one or more processors, the initial schedule from the broadcast provider computing system responsive to the request.

3. The method of claim 1, wherein identifying the initial start time for the broadcast of the live sporting event further comprises extracting, by the one or more processors, the initial start time from the initial schedule.

4. The method of claim 1, wherein identifying the duration for the broadcast of the live sporting event further comprises calculating, by the one or more processors, the duration for the broadcast of the live sporting event based on a difference between an initial end time for the broadcast of the live sporting event and the initial start time for the broadcast of the live sporting event.

5. The method of claim 1, wherein receiving the update relating to the live sporting event is responsive to transmitting, by the one or more processors, to the data source, a request for the update relating to the live sporting event.

6. The method of claim 1, wherein determining that the initial schedule is invalid based on the update further comprises determining, by the one or more processors, that the update indicates an actual start time for the live sporting event is different from the initial start time for the broadcast of the live sporting event.

7. The method of claim 1, wherein determining that the initial schedule is invalid based on the update further comprises determining, by the one or more processors, that the update indicates an actual duration for the live sporting event is different from the duration for the broadcast of the live sporting event identified from the initial schedule.

8. The method of claim 1, wherein setting the flag for the broadcast of the live sporting event further comprises transmitting, by the one or more processors, a request to the broadcast provider computing system to modify the initial start time of the broadcast of the live sporting event according to the update.

9. The method of claim 1, wherein modifying the selection policy for content to display with the broadcast of the live sporting event further comprises restricting, by the one or more processors, selection of content for display with the broadcast of the live sporting event until an actual start time of the live sporting event.

10. The method of claim 1, wherein modifying the selection policy further comprises:
    identifying, by the one or more processors, a plurality of user profiles each having one or more attributes associated with the live sporting event;
    identifying, by the one or more processors, via the broadcast provider computing system, a subset of the plurality of user profiles corresponding to a respective set of broadcast receiver devices that are displaying content; and
    selecting, by the one or more processors, at least one second wager recommendation corresponding to the live sporting event to display at the respective set of broadcast receiver devices upon the selection policy indicating that the live sporting event has started.

11. A system, comprising one or more processors coupled to memory, the one or more processors configured to:
    access an initial schedule for a broadcast of a live sporting event provided by a broadcast provider computing system;
    identify, from the initial schedule, an initial start time for the broadcast of the live sporting event and a duration for the broadcast of the live sporting event;
    receive, from a data source, an update indicating that a schedule for the live sporting event has been modified;
    determine that the initial schedule is invalid based on the update;
    set a flag for the broadcast of the live sporting event indicating that the initial schedule has changed;
    modify, responsive to the flag a selection policy for wager recommendations identifying the live sporting event to display with the broadcast of the live sporting event;

determine that a broadcast receiver device associated with a player profile is presenting broadcast content;

select, based on the player profile and the selection policy, responsive to determining that the broadcast receiver device is presenting broadcast content, a content item comprising at least one wager recommendation identifying the live sporting event for display in an application executing on the broadcast receiver device, the content item to be displayed in the application concurrent with the broadcast content; and provide the content item to the broadcast receiver device for display, the content item comprising an interactive object that, when interacted with, causes the broadcast receiver device to navigate to the broadcast of the live sporting event.

12. The system of claim 11, wherein to access the initial schedule for the broadcast of the live sporting event, the one or more processors are further configured to:

transmit a request to the broadcast provider computing system to access the initial schedule for the broadcast of the live sporting event; and receive the initial schedule from the broadcast provider computing system responsive to the request.

13. The system of claim 11, wherein to identify the initial start time for the broadcast of the live sporting event, the one or more processors are further configured to extract the initial start time from the initial schedule.

14. The system of claim 11, wherein to identify the duration for the broadcast of the live sporting event, the one or more processors are further configured to calculate the duration for the broadcast of the live sporting event based on a difference between an initial end time for the broadcast of the live sporting event and the initial start time for the broadcast of the live sporting event.

15. The system of claim 11, wherein the one or more processors are further configured to receive the update relating to the live sporting event responsive to transmitting a request for the update relating to the live sporting event to the data source.

16. The system of claim 11, wherein to determine that the initial schedule is invalid based on the update, the one or more processors are further configured to determine that the update indicates an actual start time for the live sporting event is different from the initial start time for the broadcast of the live sporting event.

17. The system of claim 11, wherein to determine that the initial schedule is invalid based on the update, the one or more processors are further configured to determine that the update indicates an actual duration for the live sporting event is different from the duration for the broadcast of the live sporting event identified from the initial schedule.

18. The system of claim 11, wherein to set the flag for the broadcast of the live sporting event, the one or more processors are further configured to transmit a request to the broadcast provider computing system to modify the initial start time of the broadcast of the live sporting event according to the update.

19. The system of claim 11, wherein to modify the selection policy for content to display with the broadcast of the live sporting event, the one or more processors are further configured to restrict selection of content for display with the broadcast of the live sporting event until an actual start time of the live sporting event.

20. The system of claim 11, wherein to modify the selection policy for content to display with the broadcast of the live sporting event, the one or more processors are further configured to:

identify a plurality of user profiles each having one or more attributes associated with the live sporting event;

identify, via the broadcast provider computing system, a subset of the plurality of user profiles corresponding to a respective set of broadcast receiver devices that are displaying content; and select at least one second wager recommendation corresponding to the live sporting event to display at the respective set of broadcast receiver devices upon the selection policy indicating that the live sporting event has started.

\* \* \* \* \*